US010322328B1

(12) United States Patent
Hart

(10) Patent No.: US 10,322,328 B1
(45) Date of Patent: Jun. 18, 2019

(54) AUTOMATIC BALL PITCHING MACHINE

(71) Applicant: Thomas Joseph Hart, Fenton, MO (US)

(72) Inventor: Thomas Joseph Hart, Fenton, MO (US)

(*) Notice: Subject to any disclaimer, the term of this patent is extended or adjusted under 35 U.S.C. 154(b) by 0 days.

(21) Appl. No.: 15/941,923

(22) Filed: Mar. 30, 2018

Related U.S. Application Data

(63) Continuation-in-part of application No. 15/000,042, filed on Jan. 19, 2016, now Pat. No. 9,943,739, and a continuation-in-part of application No. 14/986,456, filed on Dec. 31, 2015, now Pat. No. 9,937,400.

(60) Provisional application No. 62/098,698, filed on Dec. 31, 2014.

(51) Int. Cl.
F41B 4/00 (2006.01)
A63B 69/40 (2006.01)
A63B 69/00 (2006.01)
G05B 15/02 (2006.01)

(52) U.S. Cl.
CPC ........ A63B 69/406 (2013.01); A63B 69/0002 (2013.01); G05B 15/02 (2013.01); A63B 2069/0008 (2013.01); A63B 2069/402 (2013.01); A63B 2225/093 (2013.01); A63B 2225/50 (2013.01)

(58) Field of Classification Search
CPC ........ A63B 69/406; A63B 69/408; F41B 3/03
See application file for complete search history.

(56) References Cited

U.S. PATENT DOCUMENTS

| | | |
|---|---|---|
| 2,696,204 A | 12/1954 | Gilgoff |
| 3,757,759 A | 9/1973 | Haworth |
| 4,197,827 A | 4/1980 | Smith |
| 4,323,047 A | 4/1982 | McIntosh et al. |
| 4,352,348 A | 10/1982 | Griffith |
| 4,423,717 A | 1/1984 | Kahelin |
| 4,995,371 A | 2/1991 | Kuizinas |
| 5,125,653 A | 6/1992 | Kovacs et al. |
| 5,464,208 A | 11/1995 | Pierce |
| 6,182,649 B1 | 2/2001 | Battersby |
| 6,470,873 B2 | 10/2002 | Battersby et al. |
| 6,539,931 B2 | 4/2003 | Trajkovic et al. |
| 6,546,924 B2 | 4/2003 | Battersby |
| 6,820,605 B1 | 11/2004 | Suba et al. |

(Continued)

Primary Examiner — John A Ricci
(74) Attorney, Agent, or Firm — Creativenture Law, LLC; Dennis JM Donahue, III; Kevin C. Staed

(57) ABSTRACT

A game ball throwing machine that shoots balls with motorized spinning wheels has a computer processor with wheel speed equations that determine the wheel speeds according to input parameters of pitch speed, ball spin amount, and ball spin direction that a user enters through a human-machine interface on a control panel. The processor includes acceleration equations that determine the trajectories of the balls and also has a time in flight equation that is used with the acceleration equations and a distance to a target location to determine the impact point of a ball according to the same input parameters used to determine the wheel speeds. The processor determines variations in the orientation of the machine to change the impact point to a reference aim-point. The HMI can also include an aim-point change input. The ball spin direction indicator on the HMI has either a linear configuration or a polar configuration.

20 Claims, 15 Drawing Sheets

(56) References Cited

U.S. PATENT DOCUMENTS

| | | |
|---|---|---|
| 7,082,938 B2 | 8/2006 | Wilmot |
| 7,610,909 B2 * | 11/2009 | Greene, Jr. ............ A63B 69/40 124/78 |
| 8,550,063 B2 | 10/2013 | Alger |
| 9,010,309 B2 | 4/2015 | Lewis et al. |

* cited by examiner

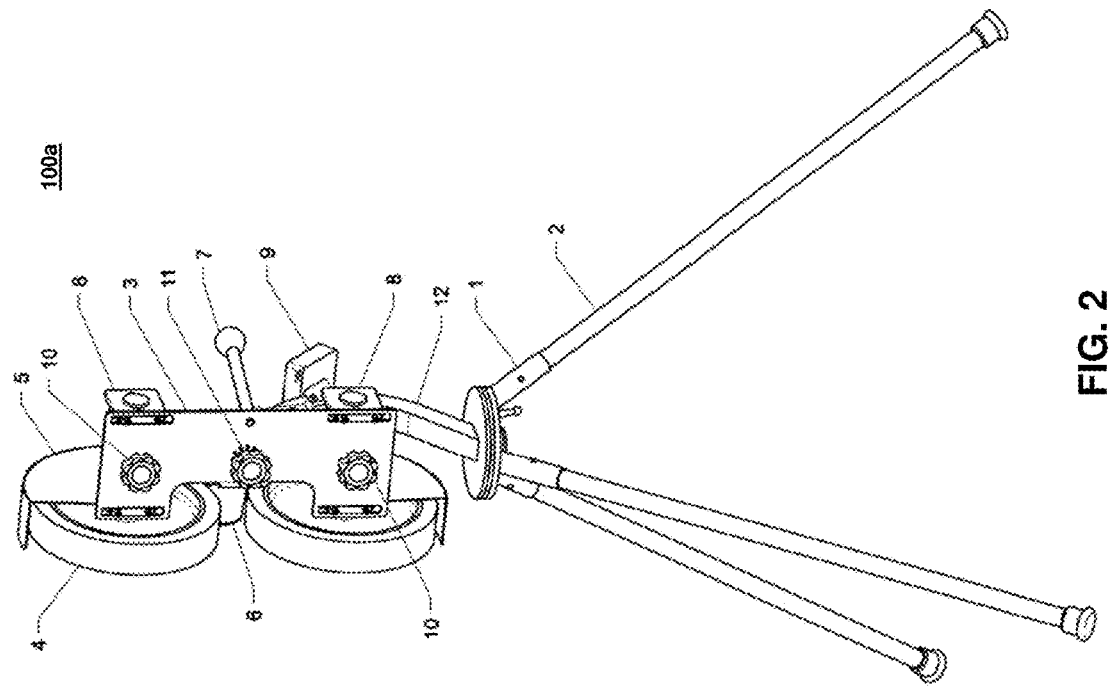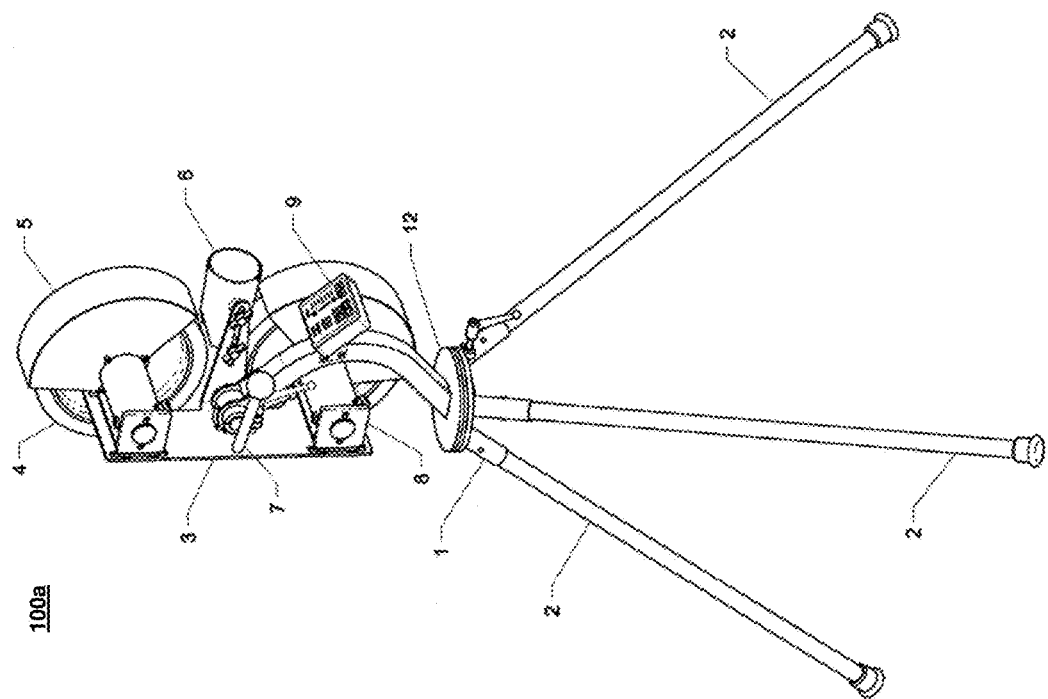

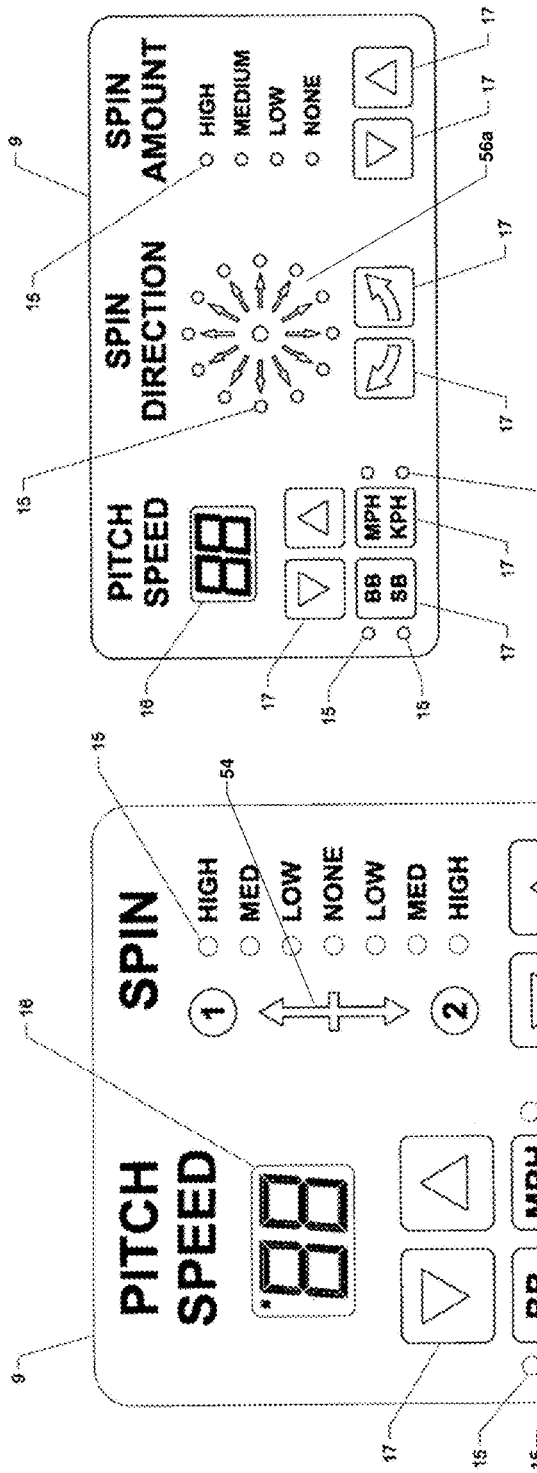
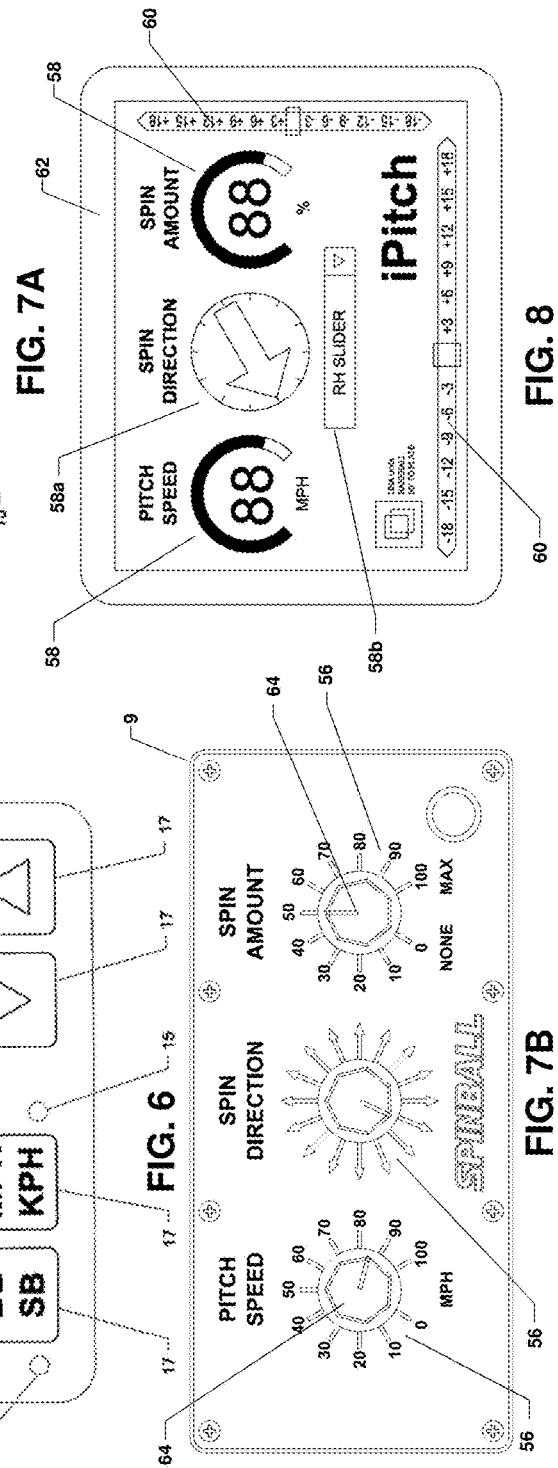
FIG. 7A
FIG. 8
FIG. 6
FIG. 7B

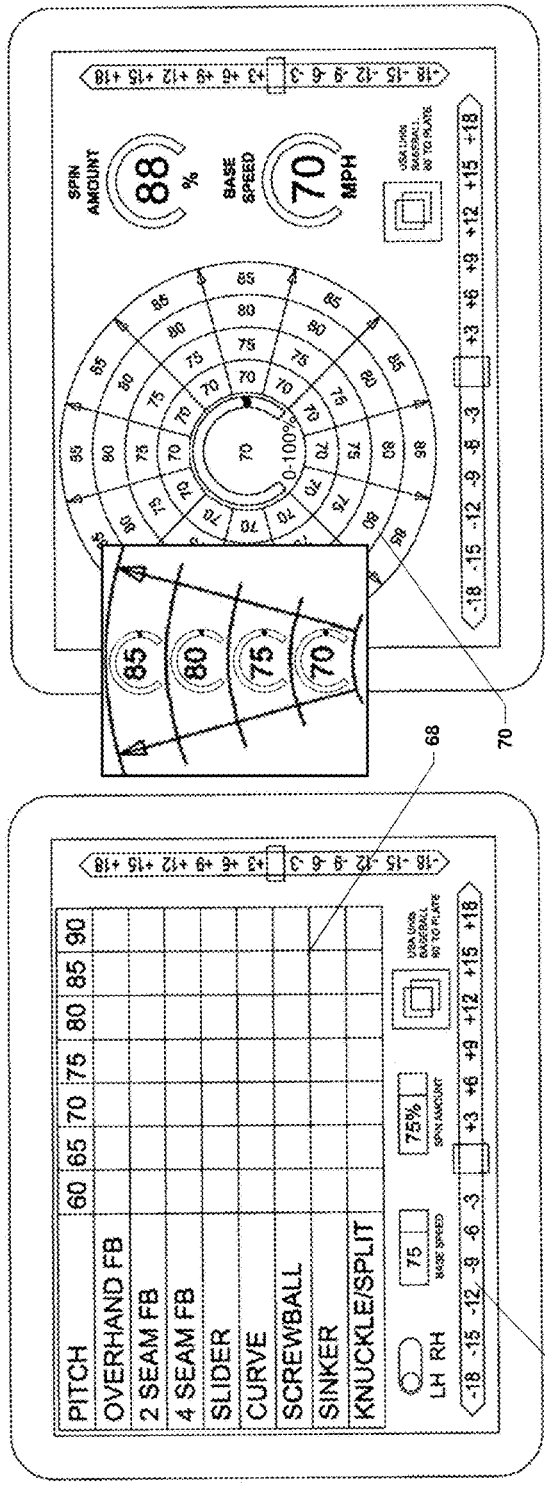
FIG. 22
FIG. 23
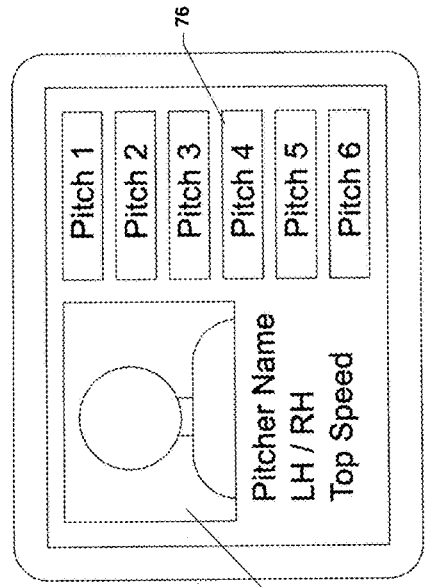
FIG. 25
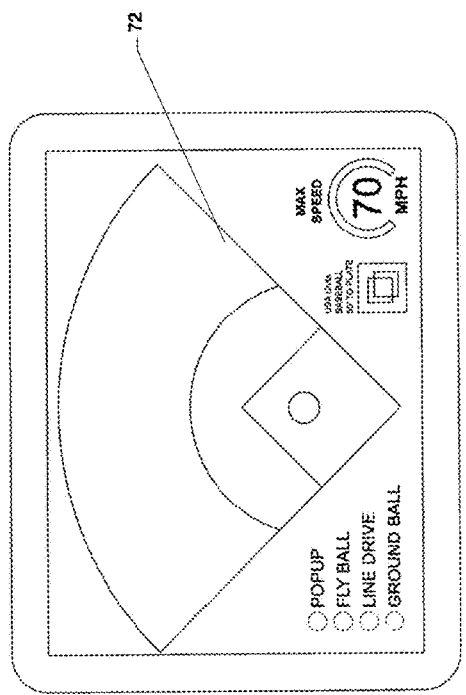
FIG. 24

AUTOMATIC BALL PITCHING MACHINE

CROSS-REFERENCE TO RELATED APPLICATIONS

This application is a continuation-in-part of U.S. patent application Ser. No. 15/000,042 filed on Jan. 19, 2016 and is also a continuation-in-part of U.S. patent application Ser. No. 14/986,456 filed on Dec. 31, 2015 which claims priority to U.S. Provisional Pat. App. No. 62/098,698 filed on Dec. 31, 2014, all of which are incorporated by reference herein.

STATEMENT REGARDING FEDERALLY SPONSORED RESEARCH

Not Applicable.

APPENDIX

Not Applicable.

BACKGROUND OF THE INVENTION

Field of the Invention

The present invention relates to devices that launch or throw sports balls, such as ball pitching machines. More particularly, the invention relates to an automatic ball throwing machine particularly suited to throwing baseballs, softballs and batting practice balls, and the invention can be used with any substantially round ball that is propelled to a player, including soccer balls, tennis balls, cricket balls, lacrosse balls, basketballs, and other sports balls.

Related Art

There are ball throwing machines used in numerous sports that assist during the playing of a sport or enable players to practice certain aspects of a sport. One example of machines aiding in the playing and/or participation of a sport includes the use of game ball throwing machines. These machines are used to throw or launch the ball used in a particular sport.

For example, in a sport such as football, tennis, soccer, cricket, basketball, lacrosse, baseball, and softball, machines are used to launch, shoot, or throw a ball toward a player to facilitate or simulate the movement of that ball as it would typically occur during the playing of that sport. For example, in tennis, tennis ball machines are used to send balls to players during practice so they can work on their game techniques. In American football, football throwing machines are commonly used to simulate a quarterback's throw to allow receivers to practice catching the ball and may also be used with kick returners for simulating punts and kicks. This general concept of using machines to deliver a ball while simulating the movement of the ball as the ball would be delivered by a person permeates most sports.

One sport in particular, diamond sports such as baseball and softball, have a type of machine generally referred to as a pitching machine. This pitching machine is a game ball throwing machine that is used to simulate the throw of a ball by a pitcher. These machines are typically used in batting practice but can also be used to simulate a pitched ball for a catcher or a hit ball from a batter to assist players in the field to work on various fundamentals. While the subject claims of this application includes pitching for batting and throwing fielding practice, as well as for launching balls for other sports, for simplicity this multipurpose invention is herein defined as a pitching machine, and the location desired for the ball, whether into a batter's strike zone or into a fielder's position is defined as aim-point, impact point and target location and type.

Typically, these pitching machines have conventionally required a person, such as another player or coach, to stand beside the machine and manually adjust the aim-point, velocity and amount and direction of curve or spin in various directions. This is time consuming, dangerous to the person operating the machine, and does not simulate the typical time required for a human pitcher to throw pitches of different types in a game situation. This practice has evolved to the implementation of automatic ball pitch programmers. These machines in prior art involve a computer controller which is preprogrammed by the manufacturer using a standard database lookup table of values to throw a standard-type pitch with a preprogrammed velocity and direction and amount of spin, representing a type of pitch such as a curveball, fastball or slider. The drawback to this mechanism is it assumes a generic pitch by type, rather than the real-world situation in which all human pitchers have unique nuances, speeds, locations and amounts of spin for a given type of pitch. The second drawback is there is no ability to alter any parameters and have the ball delivered to a desired location on the plate. For example, a little league pitcher may throw a 50 MPH fastball that drops eight inches from release to arrival at the front of the plate, with a curve to the right of one inch, while a high school pitcher may throw a 70 MPH fastball that drops six inches in the same interval with two inches of curve to the right. The same two pitchers may throw their respective fastballs, and other pitches, differently as a strategy, or due to fatigue as the game continues. These subtle nuances are not simulated by prior art which utilize a set table of variables for each type of pitch.

Another drawback to prior art pitching machines is they do not enhance or emphasize a critical aspect to successful batting by a player, namely for the batter to focus on the ball as it is being released. While there is prior art which uses a warning light, pointed at the batter, to signify a ball is about to be launched, this does not simulate a real game situation. Since there is no 'wind-up' by a typical wheeled pitching machine, there has not been a prior reliable system to encourage, enable and allow the batter to focus on the ball at or near the point of release.

All machines require a method to adjust pitch location. There are many ways to adjust the aim of the machine, including moving the base structure, moving the arm mechanism relative to the structure, and changing the release point of the ball. Methods may be manual or automated depending on the particular embodiment, but numerous methods have been established in prior art of both pitching machines and mechanisms in general, such as gear trains, stepper motors, linear actuators, sprockets, belts, etc. However, all prior art has had numerous drawbacks, particularly in their failure to simulate the variety of pitches and the speed with which they vary, in a game situation.

What is needed then is an improved game ball throwing machine that easily and safely alters the aspects of various pitches and human pitchers actually encountered in a game, and that teaches a player to focus on and pick up visually a pitched ball at the moment it is released toward the batter. This improved game ball thrower preferably has multiple pitch parameters and easily interpreted graphical user interface is designed to avoid restricted pitch parameter options and limited interfaces that are prevalent in prior art ball feeding machines. This needed game ball throwing machine is lacking in the art.

A major factor in wheel pitching machine inaccuracy is the variance in the size and compressibility of the balls used. Laces can also cause a wide error in mechanized pitching, because there is no way to know how the laces will be positioned when the wheels grab it. Spring loading the wheels (or the motors if directly connected to the wheels) greatly reduces the machine's sensitivity to ball variance. It effectively lowers the spring rate of the existing fixed assembly, so that minor differences in ball size have a much lower effect on the clamping force between the wheels (or wheel and pad for a one wheel machine). For two wheel machines, the motors can be mounted on common linear shafts, with the shafts forming the base structure of the machine's frame.

SUMMARY OF THE INVENTION

Disclosed herein is a game ball throwing machine which is automatically programmed to accept a variety of inputs based on the delivery of the ball, such as a ball speed, ball spin amount, and ball spin direction, calculate the required aim-point based on the inputs being used in acceleration equations that can determine the trajectory of the ball, and adjust the various electromechanical systems to deliver the game ball to an input desired target location according to the ball speed, amount of spin, direction of spin, or other intensity of amount of spin that is input by the user as well as the distance of the machine to the target location. This represents a major departure from prior art, which historically has required the user to rely on trial and error to vary input parameters to the throwing machine to deliver a ball to a specified spot, such as a location above the batter's home plate. The input parameters (ball speed, ball spin amount, and ball spin direction) are also used to calculate the wheel speeds for the motorized wheels that launch the balls.

It is therefore a general object of the present invention to provide a game ball thrower for delivering balls to a batter in a customized, user-selected or randomized pattern of spins, velocities and directions. Another object of the present disclosure is to provide an improved game ball pitching machine that enhances batter focus on the ball as it is pitched. Still another object of the present disclosure is to provide an automated game ball pitching machine interface that provides an easy to understand visual representation of the area above the home plate. Yet still another object of the present disclosure is to provide an automated game ball feeder that adjusts for differences in ball diameter, weight and seam location. Other and further objects, features and advantages of the present disclosure will be readily apparent to those skilled in the art upon reading of the following disclosure when taken in conjunction with the accompanying drawings.

BRIEF DESCRIPTION OF THE DRAWINGS

The present invention will become more fully understood from the detailed description and the accompanying drawings.

FIG. 1: Operator side perspective view of a two-wheeled pitching machine.

FIG. 2: Ball throwing side perspective view of the machine shown in FIG. 1.

FIG. 6: Detail view of the two-wheeled pitching machine control panel.

FIGS. 7A and 7B: Detail views of the three-wheeled pitching machine control panels with membrane switches and knob switches, respectively.

FIG. 8: Detail view of an alternative control panel for the three-wheeled machine.

FIG. 22: Detail view of the rectangular grid HMI screen.

FIG. 23: Detail view of a composite polar grid HMI screen with a magnified view of a section of the grid.

FIG. 24: Detail view of a defensive-drill screen.

FIG. 25: Detail view of a HMI specific pitcher select screen.

DETAILED DESCRIPTION OF THE PREFERRED EMBODIMENTS

Figure 3:
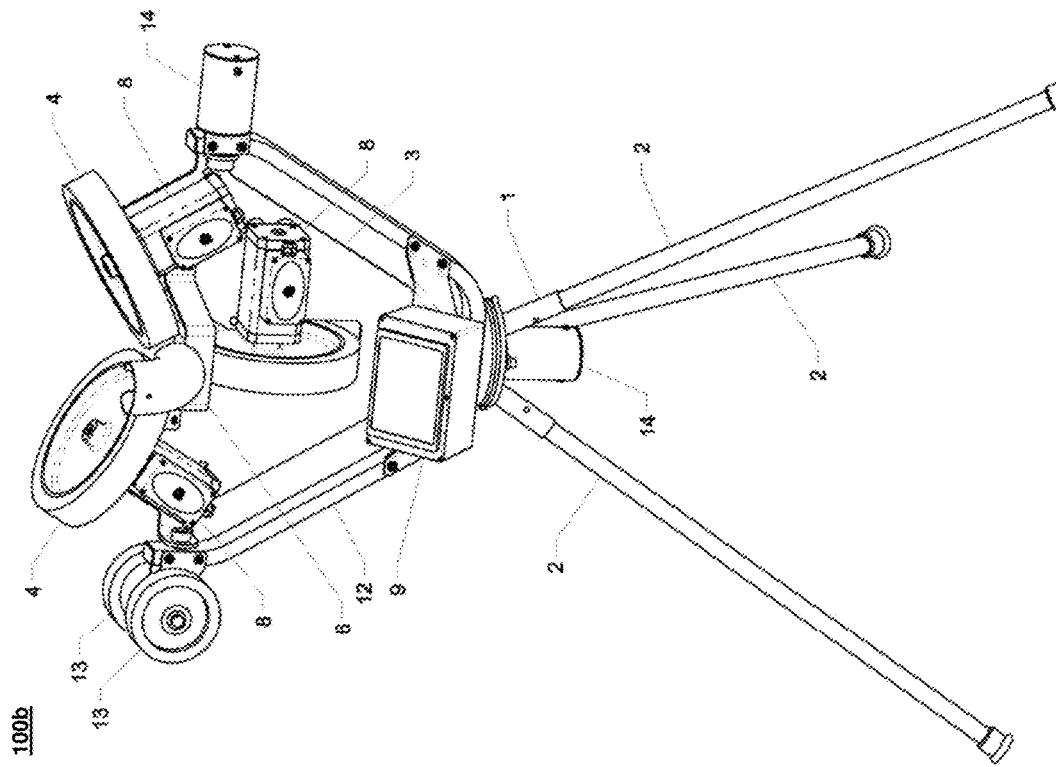
FIG. 3: Operator side perspective view of a three-wheeled pitching machine.

The following description of the preferred embodiment(s) is merely exemplary in nature and is in no way intended to limit the invention, its application, or uses As shown in the accompanying drawings referred to above, the game ball throwing machine 100 is a diamond sport ball throwing machine, such as for baseball or softball. Other throwing machines can be utilized, such as those for soccer, football, lacrosse, cricket, basketball, and the like, and are contemplated by this disclosure. Turning now to FIG. 1, the device includes a base means 1 such as the indicated tripod, comprising three or more interchangeable legs 2, motor mounting plate 3 securing one or more powered rotating wheel(s) 4 for propelling a round object such as a ball, forward or imparting spin or a combination of propulsion or spin.

In diamond sports, the game ball throwing machine 100 is generally described as a pitching machine. For simplicity's sake, the pitching machine term will be used to generally refer to any type of ball throwing machine throughout this description of the invention. The pitching machine 100 generally includes wheels 4 that spin and are used to impart force to the ball to project the ball towards a target. The wheels are driven by motors 8 which are adjusted and controlled by a series of user input controls 9. As explained below, a computer processor uses the user's pitch input parameters of pitch speed, spin direction, and spin amount to calculate the rotational wheel speeds for each of the wheels and translates the wheel speeds into signals that control the potentiometers for the motors of the respective wheels. The pitching machine has an intake opening 6 positioned and sized to receive a ball and deliver that ball to the wheels 4 for the pitching machine. The game balls (not shown) typically have two hemispheres wherein each hemisphere is engaged by one or more of the wheels 4 to impart the force to propel the ball to its target.

Around each wheel 4 is preferably a wheel guard 5. Located generally equidistant between the wheels is a ball feeder tube 6 for delivering the ball forward into the pinch point of the wheels 4. Preferably attached to the motor mounting plate is an interchangeable, removable handle 7 which may be used to manually adjust the vertical and horizontal primary aim-point of the two-wheeled pitching machine. Attached mechanically to the mounting plate 3, wheel 4 and guard 5 is a motor 8, control panel 9, motor clamping knob 10, two-wheeled system twist adjustment clamp 11, and rotating top frame 12. As explained in detail below, particularly with reference to the three-wheeled pitching machine, the computer processor can also be used with stepper motors 14, 34 to automatically adjust the vertical and horizontal aim-point. Generally, the computer processor uses the same pitch input parameters of pitch speed, spin direction, and spin amount that are used to calculate the rotational wheel speeds to also determine the trajectory of the ball, and with an input of the distance of the pitching machine to a target location, the computer processor can also calculate an aim-point for the selected pitch. The computer processor can compare the aim-point for the selected pitch with a reference aim-point, such as the calculated aim-point for the previous pitch, to determine a change in the initial trajectory of the ball and the corresponding change in the orientation of the machine that would be required for the ball to be delivered to the same aim-point as the previous pitch, and then provides control signals the stepper motors to accordingly aim the pitching machine. It will be appreciated that the automatic aiming could also be performed for the two-wheeled machine; since the plane of the wheels defines the axis of ball spin in a two-wheeled machine, to change the orientation of the spin axis on these machines, the section of the machine housing the wheels must be rotated, and this can be performed with the signals to the corresponding stepper motor controlling the plane of the wheels.

Generally, the pitching machine includes a base 1, a support frame 12 attached to the base, a drive mechanism attached to the support frame, and a control panel 9 with a computer processor that can be attached to the support frame or can have a wireless connection, such as through a tablet computer or smartphone screen. The base can be a base as known in the art that allows for height adjustment of the pitching machine with the game ball feeder. The drive mechanism can be those drive mechanisms known in the art, including various types of motors 8 that can run off AC power, DC power, or both, as desired. Additional details of the various aspects of the pitching machine according to the present invention are described below with reference to the accompanying drawings.

As illustrated in FIG. 1, a two-wheeled pitching machine 100a follows convention of a base tripod 1 with removable legs 2 supporting an upper frame structure 12 which pivots on a vertical (yaw) axis. There is a motor mounting plate 3 which pivots on a horizontal axis (pitch) with respect to the frame 12 allowing for vertical aiming. Motor plate also rotates on a second horizontal axis (roll), allowing the motor plate orientation to twist, or be rotated into any plane parallel to the vertical aiming axis. Motors 8 are fastened to the motor mounting plate in a manner that allows the gap between wheels 4 to be easily adjusted. The motors are preferably electric motors, and as explained below, the adjustment of the upper frame relative to the base and the adjustment of the motor plate relative to the upper frame can be performed through different types of rotating joints that are generally known for pitching machines. Wheels 4 and wheel guards 5 are directly attached to the motors 8 so they move with the motors as an assembly. The ball feed tube 6 is removable to allow for different ball sizes. Removable handle 7 provides the user a convenient place to grip the machine for adjusting its aim. Control panel 9 provides user a means for controlling the machine. Controls on the panel 9 allow user to control both wheel speeds and the aim of the machine.

As particularly illustrated in FIG. 2, motors 8 and wheels 4 are held in place on the motor mounting plate by threaded clamping knobs 10. A similar threaded clamping knob 11 holds the motor mounting plate 3 in place, providing a method for adjusting the roll angle of the machine.

Figure 4:
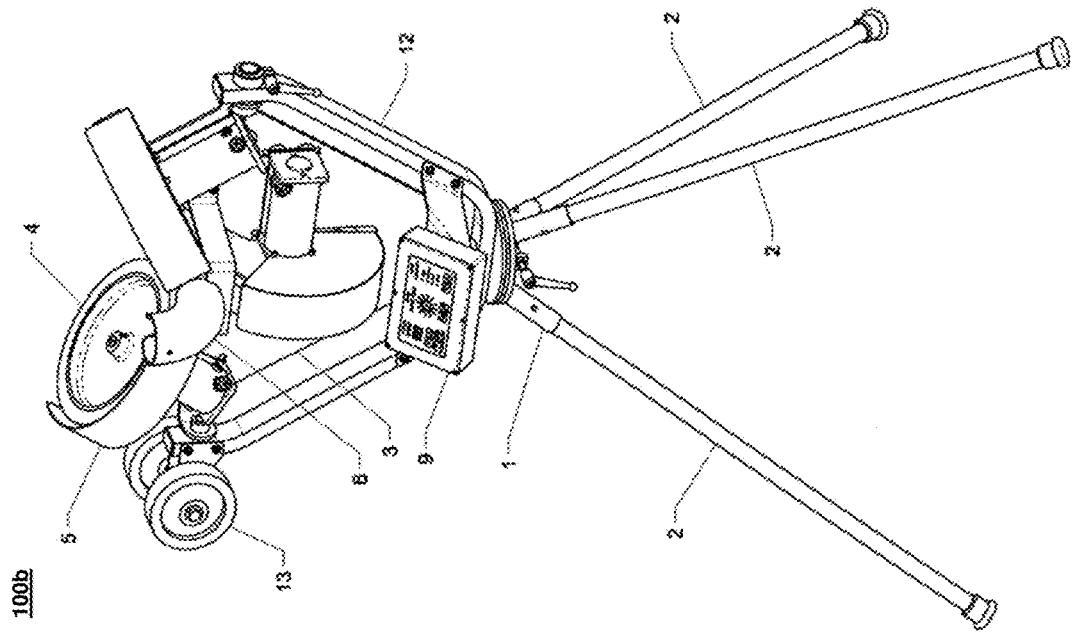
FIG. 4: Operator side perspective view of an automated three-wheeled pitching machine.
Figure 5:
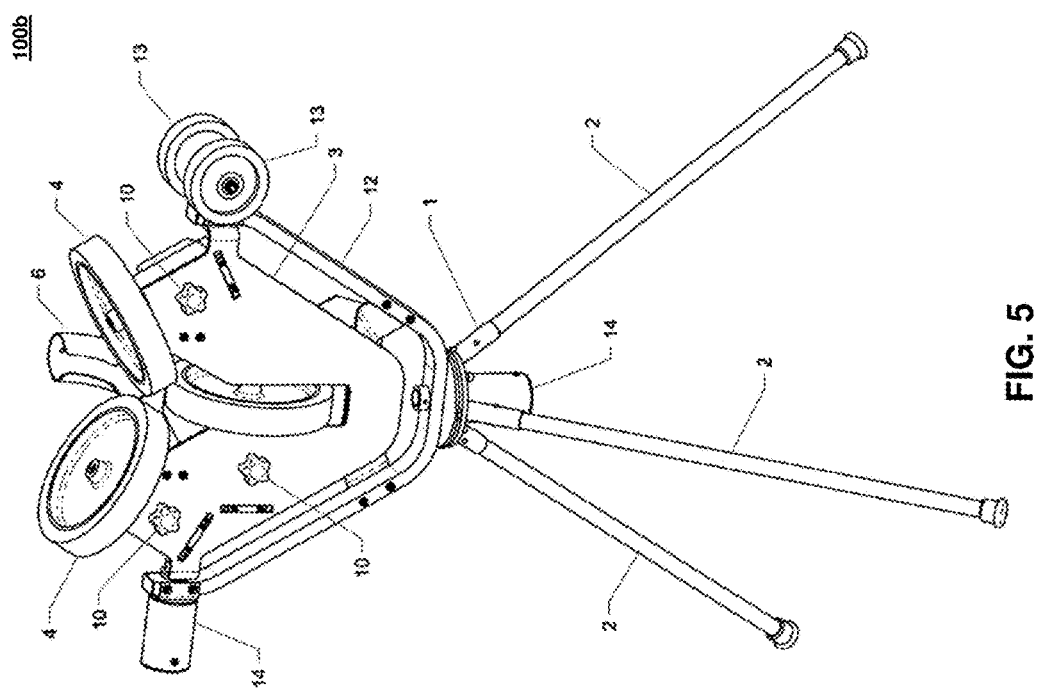
FIG. 5: Ball throwing side perspective view of the machine shown in FIG. 4.

The three-wheeled pitching machine 100b shown in FIG. 3 has the same concepts as the 2 wheel embodiment described above except there is no roll adjustment needed. As is generally known for pitching machines, the use of three wheels to propel the ball allows the differential speeds of the wheels to vary the spin axis of the ball in multiple planes without the need for a roll adjustment, whereas the two-wheeled pitching machine requires the roll adjustment because the differential speeds of a two-wheeled pitching machine with the axes of rotation of the wheels being parallel can only spin a ball with an axis of rotation that is parallel to the axes of rotation of the wheels. Removable transport wheels 13 have been added. A shown in FIG. 4, an automated three-wheeled pitching machine is includes stepper motor housings 14. Each stepper motor controls one aiming axis. The stepper motors are further described below with reference to FIG. 12. The computer processor is in operative communication with each one of the stepper motors to provide control signals for aiming the pitching machine. The back view of the three-wheeled pitching machine shown in FIG. 5 provides an alternate view of the features described above.

A two-wheeled control panel shown in FIG. 6 is a membrane switch panel with LED indicators 15 and seven (7) segment LED displays 16. A user controls the machine by pressing buttons 17 which are momentary switches that serve as selector units through which the users make their selections, and the corresponding signals for the selections are communicated to the computer processor. Graphics printed on the panel illustrate to the user how the panel works. In a two-wheeled machine in which the wheels are spaced apart directly opposite from each other, such as at 0 degrees and 180 degrees, and the wheels rotate in the same plane in opposite directions, the plane of the wheels defines the axis of ball spin, which can be either clockwise or counterclockwise, and the amount of spin placed on the ball is defined by the differential speed of the two wheels with respect to each other. Accordingly, for a two-wheel machine, a linear spin indicator representing the plane of the wheels can be used to graphically represent the direction of spin and the amount of spin in either direction. The control scheme is explained in detail later.

The three-wheeled control panel shown in FIG. 7A has the same concepts as described for FIG. 6, and the control scheme is also explained in detail below. Generally, as explained below, the wheel speeds are determined and controlled by a computer processor using wheel speed equations and the corresponding user inputs for the pitch variables in these equations, i.e., pitch speed, spin amount, and spin direction; the computer processor translates its calculated wheel speed results into control signals that it communicates to drives for the motors that rotate the respective wheels in order to control the wheel speeds. For the two-wheeled machines, the spin direction corresponds to the plane of the wheels and can be varied by different amounts in opposite directions according to this plane. Accordingly, as explained below, the control panel for the two-wheeled machines can have a simplified display in which the spin direction is a linear spin direction indicator 54 shown in opposite directions with the corresponding amount of spin. With the three-wheeled machines, the spin direction of the ball (and the orientation of the spin axis) produced by the wheels can be varied outside of a single plane without changing the orientation of the machine. Accordingly, the control panels for the three-wheeled machines preferably have a spin amount input with a separate spin direction input that is preferably arranged in a polar array 56 layout to indicate the direction in which direction the ball will curve.

The three-wheeled control panel shown in FIG. 7B has selector knobs 64 for the pitch input parameters. The indicators for the pitch input parameters are preferably a series of indicia on the control panel plate that are positioned in a polar arrangement 56 around each one of the selector knobs, and each selector knob preferably has a single pointer indicia that aligns with the corresponding indicia on the control plate identify the corresponding selection. Each selector knob connects to a rotary encoder or potentiometer within the control panel which communicates the corresponding signals for the respective selections to the computer processor. All of the control panels also have a pitch speed input that is preferably separate from the spin direction and the spin amount. However, as explained with reference to FIG. 23, it is possible to have a composite display in which the pitch speed, spin direction, and spin amount can all be simultaneously displayed on a single graphic image that allows a single-touch selection of all three (3) pitch input parameters. Additionally, it will be appreciated that rotary encoders and potentiometers could be used on the same control panel; for example, the control panel shown in FIG. 7B uses potentiometers for the speed and the spin amount and uses an encoder for spin direction. Accordingly, any type of the selector could be used for accepting the pitch input parameters.

In the present invention, the motor speed controls for the wheels preferably use a 0-5 volt analog input signal for communicating the target speed or set point to the corresponding motor drives. Digital potentiometers have been used to create the 0-5 volt analog signal from a microcontroller with no analog capability. It will be appreciated that new types of selectors can be used in place of analog or digital potentiometers. For example, rather than using digital potentiometers, new selectors can produce pulse width modulation (PWM) signals or other digital signals to create a simulated 0-5 volt signal so that the control panel microcontroller communicates directly with the motor drive through PWM.

A three-wheeled control panel adapted for a tablet computer or smartphone screen is shown in FIG. 8. The control panel consists of rotary slider widgets 58 for setting pitch speed and spin amount. Spin direction is set by rotating directional arrow widget 58a or by selecting a pitch name from the dropdown 58b. Horizontal and vertical aim are set by linear sliders 60. It will be appreciated that the control panels shown in FIGS. 6 and 7 could also be implemented with a touchscreen display 62 or on a wireless tablet computer or smartphone and may also include the linear sliders for setting an aim-point.

Figure 9:
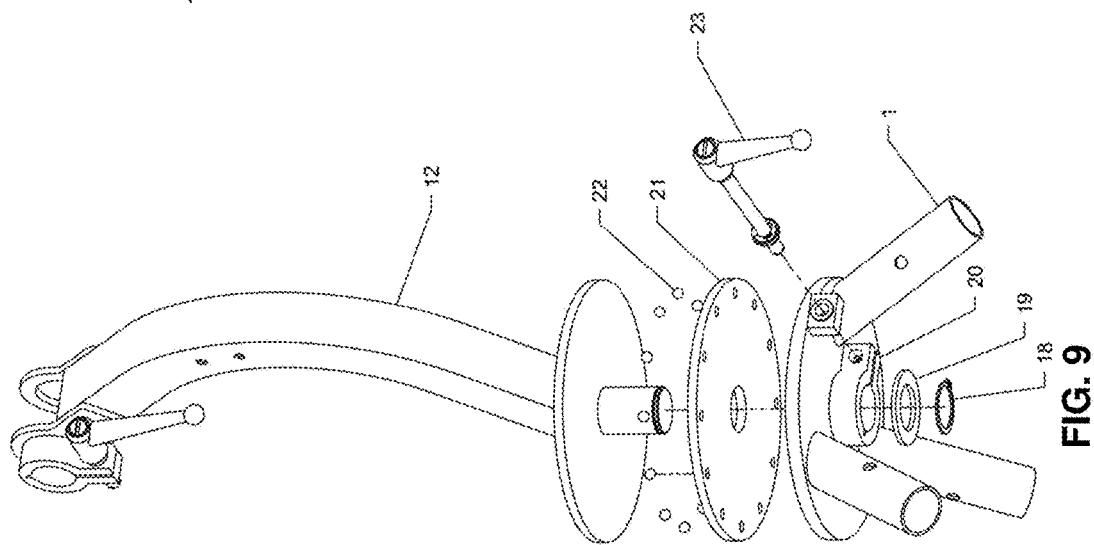
FIG. 9: Perspective detail view of the two-wheeled machine turntable.

A two-wheeled turntable shown in FIG. 9 has a low friction disk 21 and stainless steel balls 22 that form a large turntable or thrust bearing, allowing upper frame member 12 to rotate freely relative to tripod base 1. A shaft clamp 20 is fixed to the base tripod 1 allowing a method for locking rotation of 12 when desired. Clamp handle 23 provides user easy access to partially hidden shaft clamp 20. Thrust bushing 19 and retaining ring 18 keep parts assembled without preventing rotation.

Figure 10A:
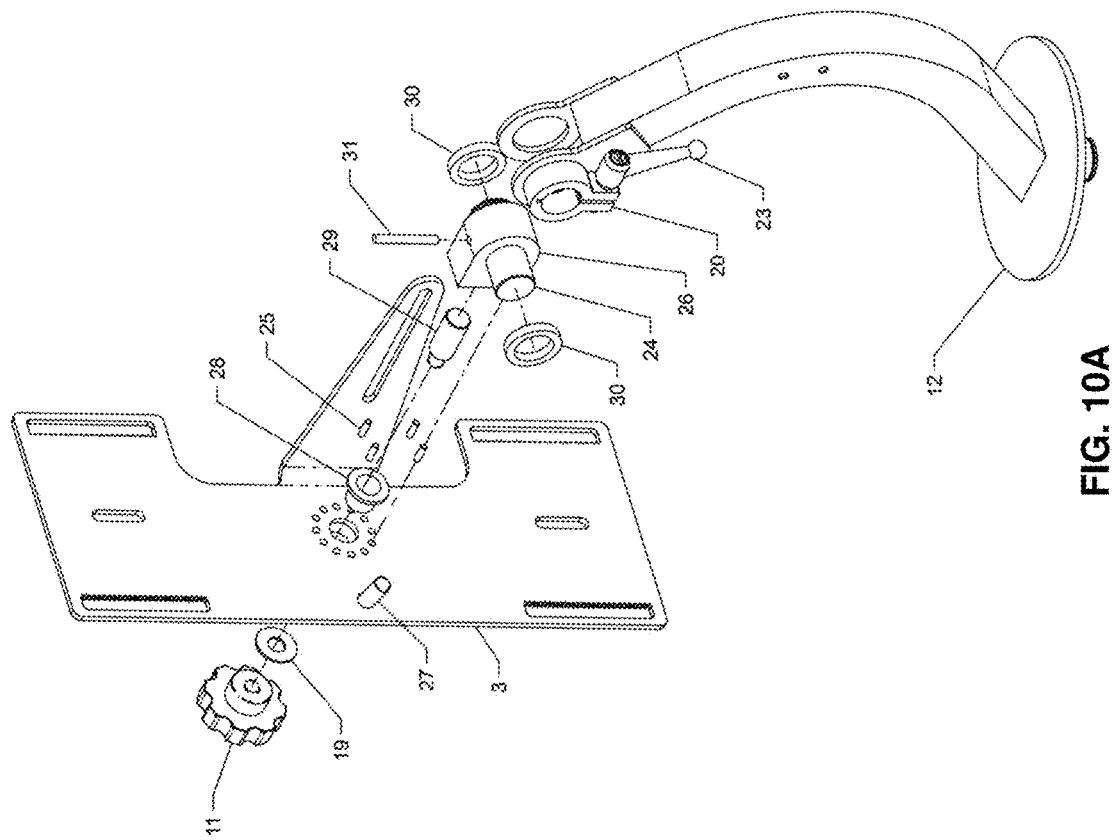
FIGS. 10A and 10B: Perspective detail views of alternative two-wheeled machine pitch and roll adjustment mechanisms.

A two-wheeled pitch and roll adjustment is shown in FIG. 10A. Machine roll angle is set by rotating motor mounting plate 3 about shaft 29. Flanged bushing 28 allows free rotation of said motor mounting plate, and limited axial movement along said shaft. The shaft collar/clamp handle 23 connects to the shaft vertical aim adjustment means 24. One or more dowel pins 25 are connected to the clevis block 26, and a handle mounting stud 27 is provided on motor mounting plate 3. When clamping knob 11 is clamped down, dowel pins 25 engage in a circle of holes in the motor mounting plate 3 preventing unintentional rotation. Shaft 29 and dowel pins 25 are fixed to a clevis block 26 which is in turn, fixed to the pitch angle shaft 24 with dowel pin 31. Clevis block 26 and pitch angle shaft 24 rotate freely on ball bearings 30 mounted on upper frame member 12. A shaft clamp is fixed to the upper frame member 12 to lock pitch angle shaft 24 setting the pitch angle of the motor mounting plate. A handle 23 with a threaded stud, provides user with a convenient way to close the shaft clamp 20.

Figure 10B:
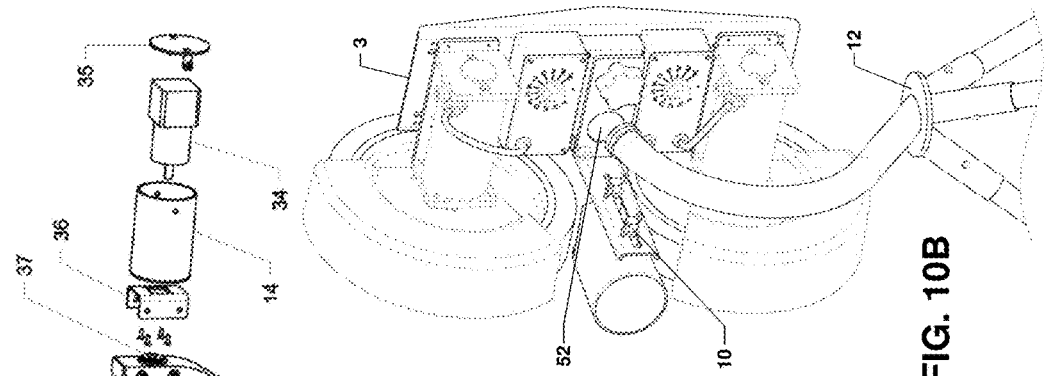

It will be appreciated that different types of adjustment mechanisms can be used with the innovations of the pitch machine according to the present invention. For example, an alternative pitch and roll adjustment mechanism is shown in FIG. 10B for a two-wheeled pitching machine. According to this alternative embodiment, the pitch and roll of the mounting plate 3 can be adjusted using a single ball and socket joint 52. The joint is locked by turning the clamping knob 10 clockwise until tight. To adjust the machine, a user can grasp the machine's frame 12 and turn the clamping knob counterclockwise until the joint is loose enough to move, and then the mounting plate can be rotated to the desired position where the joint is locked in place. Preferably, the joint is loosened just enough to adjust the mounting plate with a little effort, but not loosen it enough that it can flop around on its own. For horizontal adjustments, the ball and socket joint can be used, or a turntable can be used if there is one, or the entire machine can be rotated at the base legs.

Figure 11:
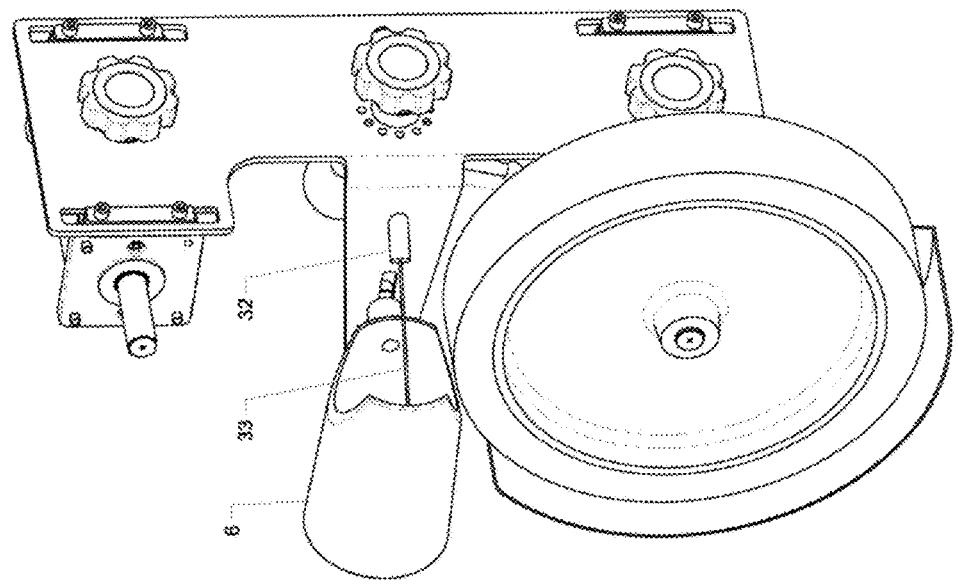
FIG. 11: Detailed view of the ball illumination means.

A laser pointer/spotlight feature is illustrated in FIG. 11. A highly focused beam of light 33 is shot across the path of a ball to be thrown, by a laser pointer or small spotlight 32. The light beam is not visible to the hitter until a ball crosses its path. Because the beam 33 is located just before or in close proximity to the point where the ball is launched, the appearance of the beam on the ball acts as a visible indicator that a pitch is imminent or occurring. This light, or a subsequent light 32 could also be located some distance closer to the batter, to assist in timing of the pitch by the batter and enable the batter to better focus on the ball.

Figure 12:
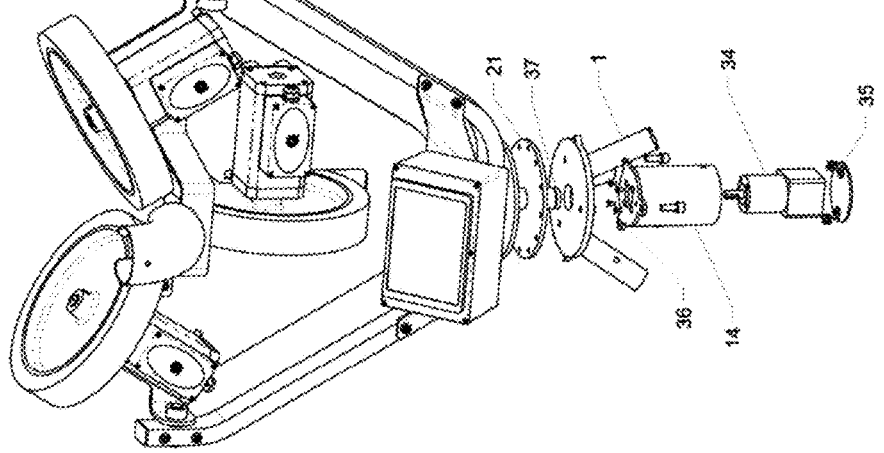
FIG. 12: Exploded detail view of stepper motors.

Details of the stepper motors are shown in FIG. 12. The motor mounting plate's yaw and pitch angles are set by geared stepper motors 34. Motors are protected by separate housings 14 which have removable covers 35. Stepper motors are mounted to the machine with brackets 36 that allow the use of common parts with machines that are aimed manually. Stepper motor shafts are keyed to transmit torque to hollow shafts 37. This design allows some axial play between the hollow shaft 37 and the stepper motor 34. This prevents any axial load from reaching the stepper motor and damaging it, while also minimizing tangential play that would affect accuracy.

Figure 14:
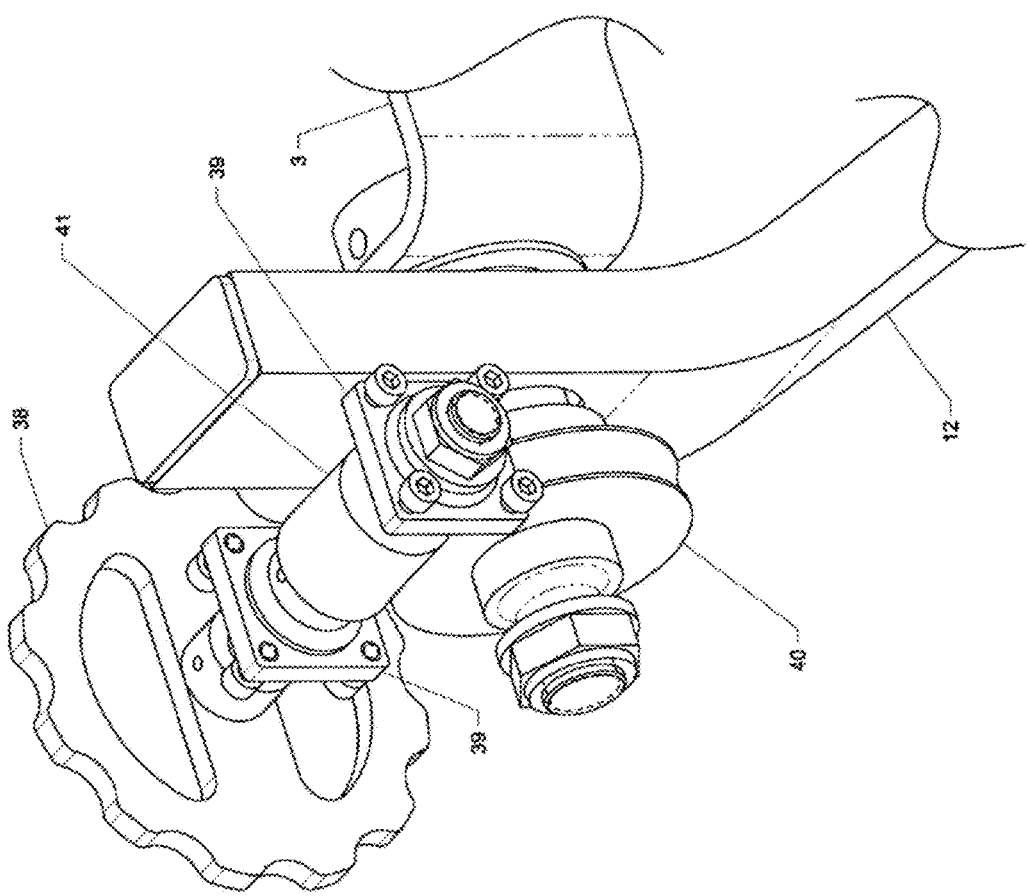
FIG. 14: Alternate perspective view of worm gears.
Figure 13:
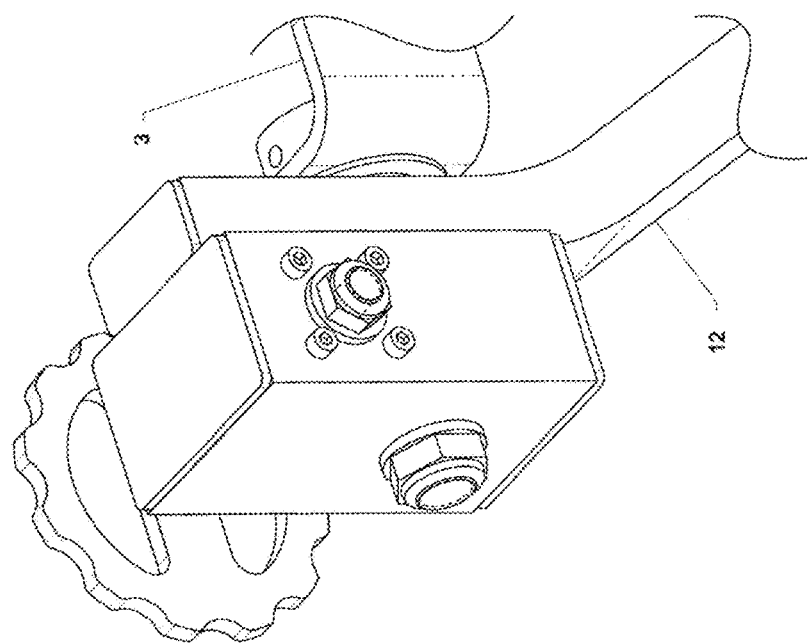
FIG. 13 Enlarged perspective view of worm gears.

As illustrated in FIGS. 13 and 14, worm gears provide a fixed, unchanging ratio between input rotation angle and output rotation angle, which a threaded rod arrangement such as the Sports Attack machine does not. The design is self-locking because it cannot be back driven. User turns hand wheel 38 which rotates the worm 41 inside mounted ball bearings 39. As the worm 41 rotates, so does worm gear 40. Worm gear 40 is attached to motor mounting plate 3 so turning the hand wheel 38 provides a highly leveraged, self-locking method of rotating the motor mounting plate 3 relative to 12, setting the pitch angle of the machine.

Figure 15:
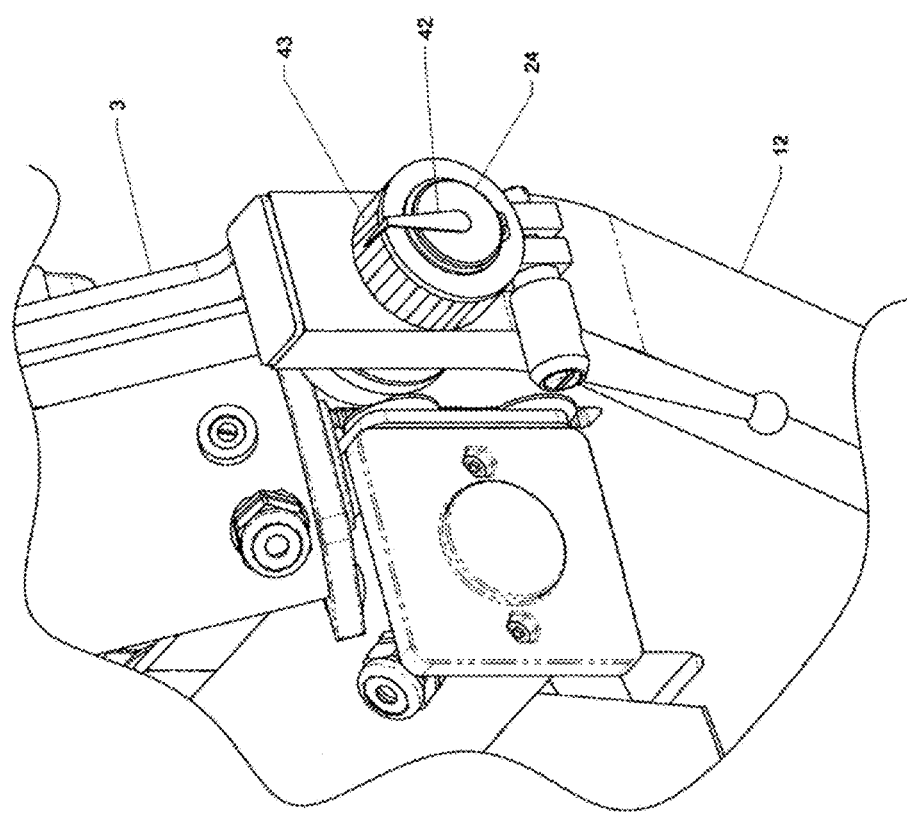
FIG. 15: Enlarged perspective view of an angle indicator

An angle indicator is particularly illustrated in FIG. 15. An indicating pointer 42 is attached to horizontal shaft 24 so that the pointer rotates with the shaft, and thus also the motor mounting plate 3. A visual scale 43 is added to the upper frame 12. As the machine's pitch angle is adjusted, the user is provided with visual feedback, informing them how far the machine has moved. A similar indicator can be added for horizontal adjustments.

Figure 16:
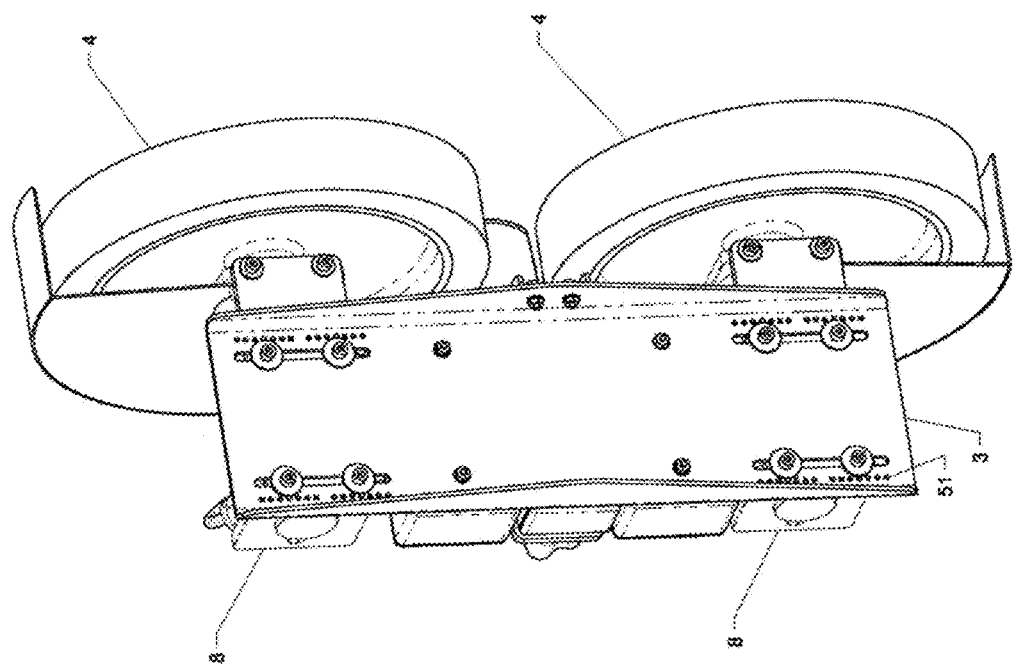
FIG. 16: Enlarged perspective view of the pegboard motor locator.

A pegboard motor locator is illustrated in FIG. 16. Motors 8 and thus wheels 4 can be repositioned to adjust the size of the gap between wheels. This is useful for resetting the machine for balls of different size and hardness. The pegboard design consists of a grid of holes 51 in the motor mounting plate 3 and dowel pins affixed to the motors 8. This provides a set of predefined motor and wheel positions for the user.

Figure 18:
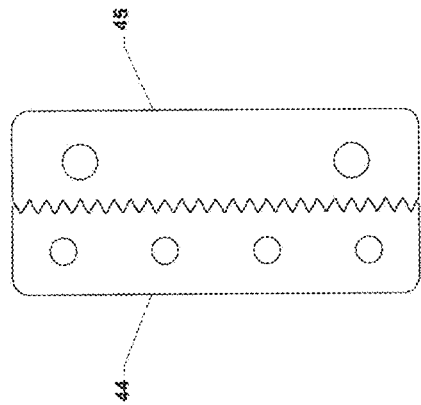
FIG. 18: Detail view of the sawtooth.
Figure 19:
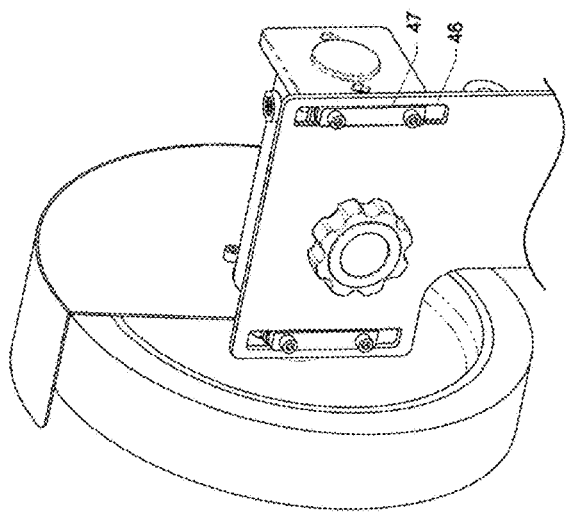
FIG. 19: Enlarged perspective view the profiled block.
Figure 17:
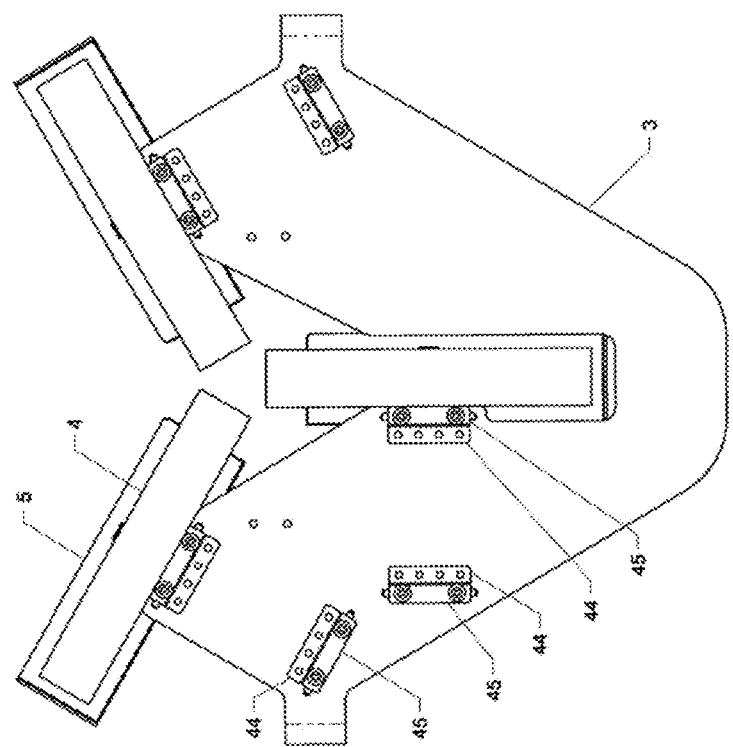
FIG. 17: Front view of the sawtooth motor locator.

A sawtooth motor locator is shown in FIG. 17, and FIG. 18 shows a close up view of the sawtooth design. Sawtooth shaped plates 45 are affixed to the motors 8 and a mating set of sawtooth shaped plates 44 are affixed to the motor mounting plate. This provides a set of predefined motor and wheel positions for the user. The step size is reduced as compared to the pegboard design, which is limited by the size of the dowels, and the intersection of adjacent grid holes. FIG. 19 shows a profiled block as a variation of the sawtooth design in which profiled blocks 47 are affixed to the motors, and mating profiled pockets 46 are designed into the motor mounting plate 3. The concept is the same as the sawtooth, but reduces part count.

Figure 21:
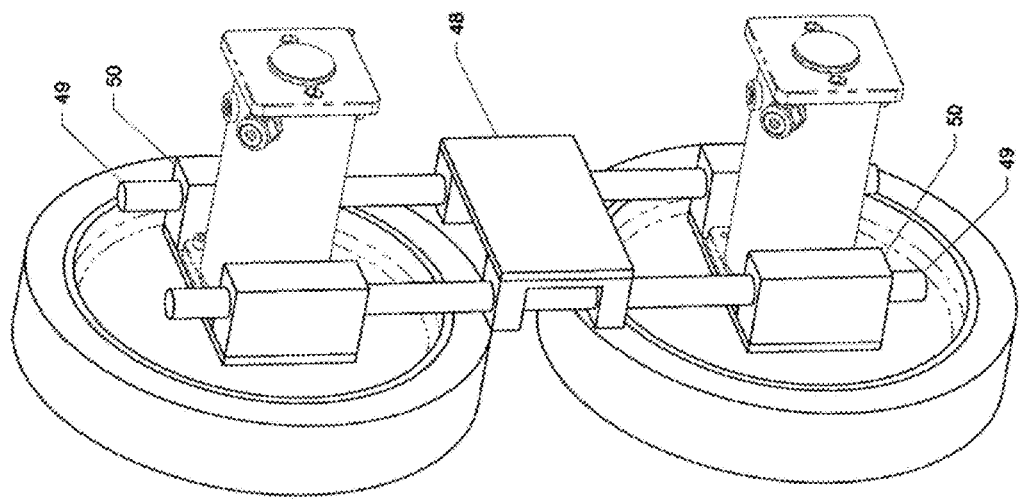
FIG. 21 Enlarged perspective view of the bearing means.
Figure 20:
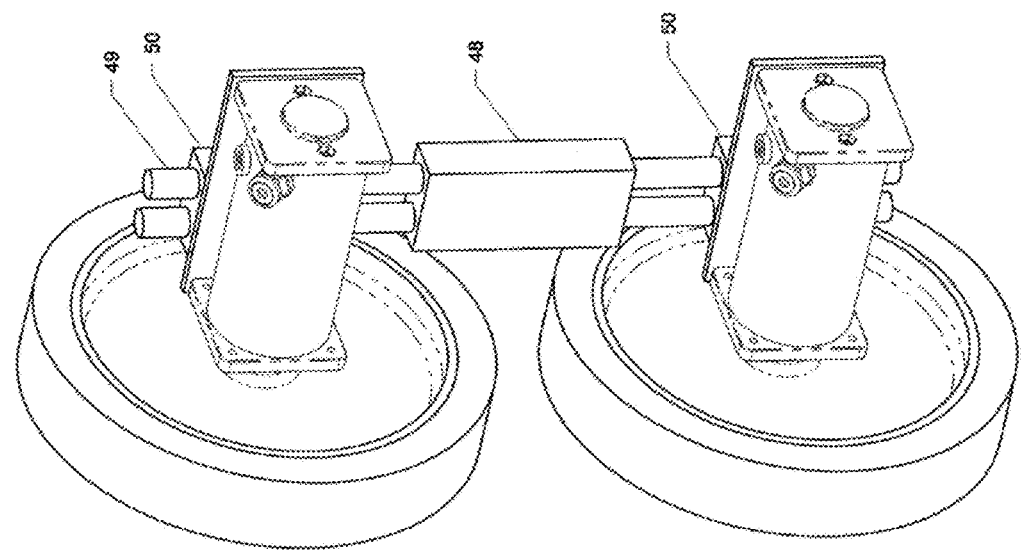
FIG. 20 Enlarged perspective view of the linear bearing machine.

FIGS. 20 and 21 illustrate a linear bearing machine in which the motor mounting plate is replaced with a parallel linear shaft system. Motors 8 and thus wheels 4 are mounted on linear bearings 50. The bearings slide on linear shafts 49 which are held in place by a fixed center block 48. As balls are fed into the wheels 4, the wheels are free to slide, expanding the wheel gap. This provides shock absorption and a longer contact time between ball and wheel. It also greatly reduces sensitivity to using balls of slightly different sizes or hardness. Expanding the range of motion allows the same basic design to be used for various sized balls of different sports. The motors may be spring loaded to return them to position after a ball has been thrown, but the inertia of the motor may in many cases provide the ball clamping force needed to properly grip the ball. The same basic two shaft layout may be used without the shock absorbing function by replacing one of the linear shafts with a shaft threaded half left-hand, half right-hand. As the shaft is turned, the motors would both move in or out from the center position. This provides a convenient way to quickly adjust the size of the ball gap.

FIG. 22 illustrates a human machine interface (HMI) screen display with a rectangular grid of pitches 68 that provides a multitude of pitches which can be selected by a single touch. As with the displays of the tablet computers and the smartphones, the HMI screen display is preferably a touchscreen which serves as a selector as well as a display. However, it will be appreciated that the HMI screen display could be operated on a laptop computer or desktop computer that may or may not have a touchscreen. Accordingly, in making selections using the HMI screen display, it will be appreciated that other HMI selectors could be used, such as a mouse or a trackpad or any other HMI device that allows the user to make a selection from the options presented on the HMI screen display, particularly including voice command.

FIG. 23 illustrates a HMI screen display with a polar grid 70 of pitches that provides a range of pitch speeds for each spin direction to simultaneously display a multitude of pitches which can be selected by a single touch. The spin amount can be selected with a separate slider, such as a rotary selector, or may be incorporated into each segment that defines a unique pitch speed/spin direction combination to allow for the single-touch pitch selection. In the detail view of FIG. 23, a section of the composite polar layout is shown with an example of a rotary spin amount selector that can be varied from 0%-100% within each one of the pitch speed/spin direction combinations that allows for the single-touch selection of all three (3) pitch input parameters. Accordingly, the composite polar layout provides a graphical representation of which direction the ball will curve in combination with the pitch speed and may also include the spin amount.

FIG. 24 illustrates a HMI screen display with a defensive screen 72. Place the machine at home plate, and a single touch positions the machine to throw the ball to the indicated location on the field. A user can select ground balls, fly balls, or line drives.

FIG. 25 illustrates a specific pitcher HMI screen display. Users can create custom pitchers 74, each with a picture, a top speed, and a set of pitches. Each of these pitches 76 can be customized to exactly match real or fictional pitchers using the same pitch input parameters as entered with the control panels or touchscreens generally described above, (i.e., pitch speed, spin direction, spin amount). Machines can be provided to customer with a library of these pitchers, or users can create their own. Because the machine aim according to the present invention is automatically calculated with acceleration equations based on the pitch parameters, the trial and error method of aiming the machine of prior art is eliminated.

As explained below and shown in the graphs of FIGS. 26A-26D, sets of horizontal acceleration equations and vertical acceleration equations for a range of pitch speeds have been developed for varying ball spin rates from no spin (0%) to the maximum spin (100%) and for different types of balls, such as a dimpled practice baseball and a low seam laced baseball. According to the innovative computing aspects of the present invention as described in detail below, the computer processor uses the pitch input parameters (i.e., pitch speed, spin rate, and spin direction) to determine the wheel speeds that will shoot the ball from the machine, and the computer processor also uses these same pitch input parameters to determine the horizontal and vertical acceleration equations that define the trajectory of the ball. With accelerations that define the trajectory and a known target distance to a target location, the computer processor can also calculate the aim-point for the pitch machine to the target location. The user can enter a target distance into the pitching machine, and the pitching machine's memory can also store standard target distances from the pitching machine to predefined target locations, such as the specified distance of sixty feet and six inches (60' 6") from the pitcher's plate on the pitching mound to the rear point on the home plate or forty six feet (46') for youth baseball or forty three (43') for softball. The computer processor translates the calculated wheel speeds into control signals that are communicated to the drives of the motors for the respective wheels, and the computer processor also translates the aim-point adjustments into corresponding motor control signals that are communicated to the motor controllers to aim the pitch machine.

Figure 27A:
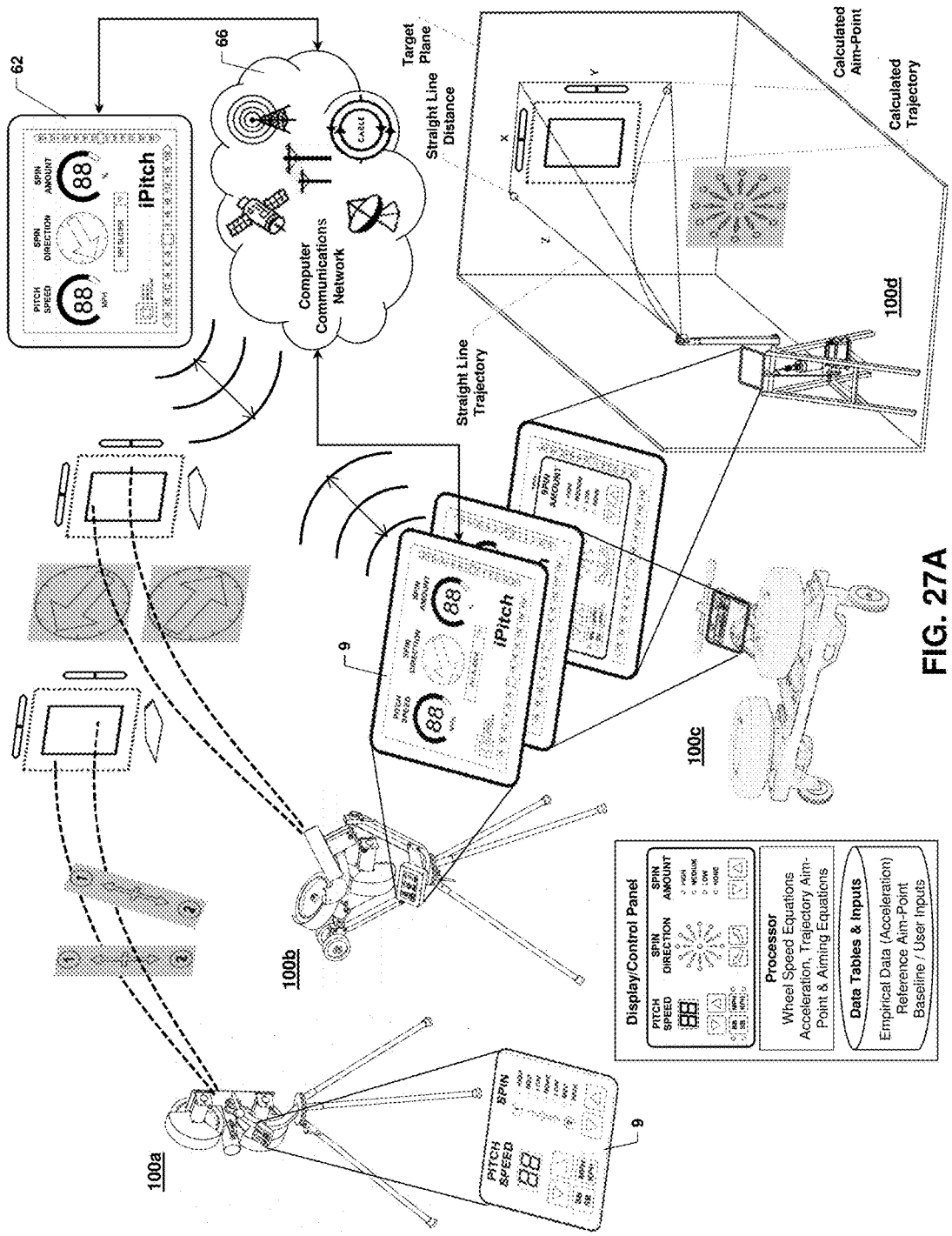
FIGS. 27A and 27B: Schematic diagram and flow chart of the system, respectively.

FIG. 27A illustrates a system diagram of optional pitching machines 100 according to the present invention with optional communication protocols between the control panel and the motors and their respective controllers that rotate the wheels and adjust the orientation of the wheels and the corresponding trajectory of the ball as it is initially shot out of the machine. As described above, the control panel 9 with the input controls and the computer processor can be attached to the pitching machine or there can be a wireless connection 66 between a processer and controllers on the machine and a tablet computer or smartphone that can serve as the control panel with the input controls and may also perform the calculations for the wheel speeds, acceleration, and aiming. Additionally, as indicated in the description of the various innovative features of the present invention, these features can be incorporated into other types of ball throwing machines 100, such as the soccer ball shooting machine 100c as well as the arm-type pitching machine 100d.

Figure 27B:
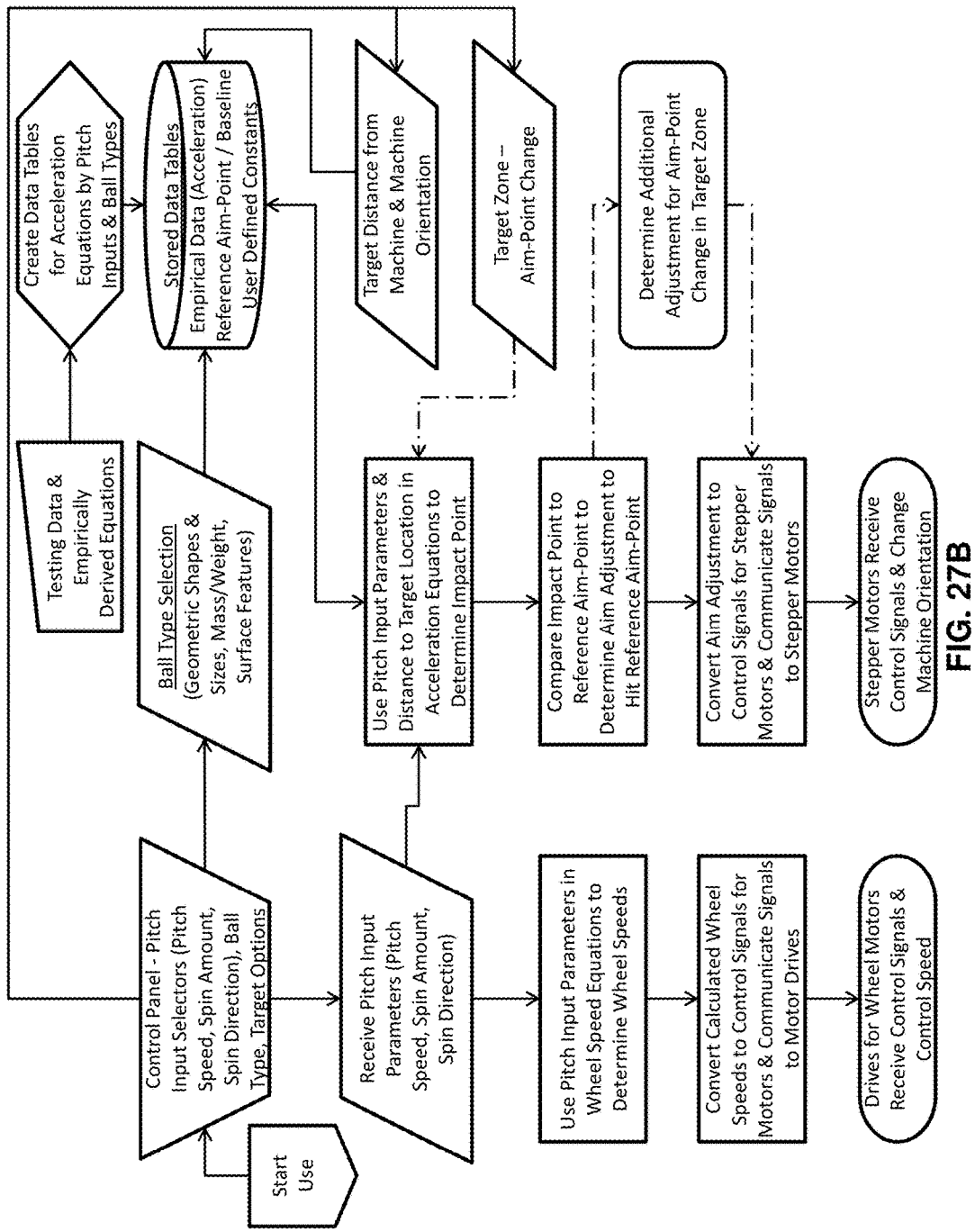

FIG. 27B illustrates the steps for the innovative methods of the present invention which is described in detail below. Generally, the present invention has a computer processor that uses pitch input parameters of pitch speed, spin amount, and spin direction for a selected pitch to calculate the rotational wheel speeds for each of the wheels and translates the wheel speeds into control signals that control the drives for the motors of the respective wheels. Additionally, with a given distance of a target location from the machine, the computer processor uses the distance in combination with the same pitch input parameters and a set of acceleration equations to determine an aim-point at the target location for the selected pitch. The computer processor can compare the aim-point for the selected pitch with the reference aim-point to determine the change in the orientation of the machine that would be required for the ball to be delivered to the same aim-point as the reference aim-point, and then provides control signals the stepper motors to accordingly aim the pitching machine. The equations can also be used with inputs for aim-point changes to make additional adjustments to change the aim-point for the selected pitch.

The use of the pitch speed, spin amount, and spin direction to determine the wheel speeds and the aim-point according to the present invention differs significantly from prior art pitching machines which control the machine settings (wheel speeds and orientation) using tables of the machine settings for predefined types of pitches (i.e. fastball, slider, curveball, screwball, knuckleball) at a range of speeds. These types of tables do not use any type of equation to calculate the trajectory for a pitch and would have no way to determine the changes required in the machine settings to make target location and aim-point adjustments unless these variations are stored in the tables. For example, for a given pitch, according to the prior art pitching machines, when a user wants to change the location of the aim-point from to different regions within a strike zone, the machine settings data for each region of the strike zone must be stored in the tables, but if the user wants to move the aim-point outside of the strike zone where there is no table entry, there is no way for the machine's computer processor to determine the appropriate settings. Similarly, if the user wants to move the aim-point to a particular spot within one of the regions, such as at a corner, the prior art machines have no way to provide this level of control. Additionally, the prior art machines are necessarily limited to the target distances that are used to develop the tables. In comparison, the present invention's use of the pitch input parameters to set wheel speeds and to also feed into acceleration equations that define the ball trajectories gives users the ability to vary pitches and aim-points in ways that were not possible according to the operations of the prior art machines. It will be appreciated that the control panels and computer processor of the prior art machines can be replaced with those of the present invention, and the electro-mechanical components of prior art machines would operate according to the innovative aspects of the present invention which is an entirely different principle of operation.

Low cost, commercially available microcontrollers and microprocessors are used to control the machine. The specific hardware used is not critical, but some possible selections are the Raspberry Pi, Beaglebone Black, or any similar device which supports web hosting or wireless communication either natively or with additional hardware, and provides GPIO (General Purpose Input/Output). Control signals and sensors interface to and control and sense the real-world and the hardware in a traditional manner. As generally explained above and described in detail below, one of the novel aspects of the present invention is the unique algorithm means within the system software which integrates the signals, sensors and hardware together with a unique and novel interface device.

The user interface can be accomplished with a panel or touchscreen mounted to the pitching machine or via a standard wireless touchscreen device, such as a tablet or smartphone, running a standard web browser, coupled with the novel software system of the subject invention. The invention can used with a web browser, or custom written application. The computer software program may be run on any wireless device and/or host device (Raspberry Pi, etc.). One can use VNC (virtual network communication) protocol to connect the wireless device to the host device.

The machine's control system includes a web server and wireless interface. The user loads the web pages hosted by the web server and controls the machine by manipulating the inputs shown on the interactive web pages. Through use of the unique software, it is also possible to create custom applications based on the touchscreen's operating system, for download from the internet.

There are several modes for the machine to operate in, so there are several specialized pages to load. Some of these modes are: machine setup, custom pitch, help, defensive drills, one touch pitch selection, and random sequence. The one touch screen provides a grid of buttons that set the machine for a large variety of pitches with a single touch to allow the fastest possible pitch selection. The random sequence mode allows users to select from a menu of available pitches at a range of pitch speeds. Users may select as many pitches from the menu as desired. Each mode includes tools for the user to select pitch location. The user interface can be used on any style of machine (wheeled, arm, air cannon) and is described in more detail later in this specification.

It can be difficult to make small adjustments to a typical pitching machine because they are so heavy and unbalanced, and the movements are so small. Some manufacturers have added worm gears or threaded rods to aid the user, but these are cumbersome, inaccurate and time consuming to adjust, resulting in a less than realistic simulation of a pitcher varying locations of his pitches to the batter during a game.

Two methods disclosed in the subject invention to remedy this shortcoming in the prior machines are: 1) adding geared (or ungeared) step motors to the adjustment mechanism and 2) adding a visible scale so the user has a reference to easily see how far they have moved the machine. The scale can be divided into units of distance as measured at the pitch's destination (typically home plate) as opposed to actual distance moved at the machine, for easier understanding by the user.

As mentioned earlier, an unmet need in the prior art was to teach batters to focus on the ball as it is pitched, versus a light shining toward the batter as in prior art. Even when the ball is visible from a distance, it is not obvious to a hitter the exact time that ball will be thrown by a pitching machine. A localized light source at the ball's exit, illuminating the face of the ball visible to the batter, provides a visual cue to the batter that the pitch is being thrown and drawing attention to the ball. Existing machines have warning lights to indicate an imminent pitch, but the design of the subject invention results in a benefit unanticipated by those skilled in the art, in that it allows the hitter to focus on the ball itself, not an indicator off to the side. A related improvement could also entail additional lights, possibly of different colors placed along the ball's path shining on a portion of the ball, which can be used as a timing aid.

A pitching machine must have a user interface of some kind to allow a user to control the machine. Most wheeled pitching machines provide individual motor speed controls for each wheel, typically a manually turned rotary potentiometer. While flexible, this method does not make it obvious to the user how to throw each type of pitch, or even how fast it will be. Several manufacturers resort to tables of values as a guide for the user to set manually, but these are cumbersome and can't cover all available pitches. Other manufacturers have added push button control, where users select a pitch by name and a speed, and the wheel speeds are set automatically. The downfall here is that pitch names are not universal, and again, not every pitch the machine could throw is selectable.

The subject invention disclosed herein, allows users to explicitly set a pitch speed, spin direction, and spin amount. Ball spin translates into the curve or break of a pitch. All three settings can be continuous or discrete amounts. The interface shown in FIG. 7A shows twelve (12) spin directions and four (4) spin amounts, but any number may be used. For example, the interface shown FIG. 6 only has two (2) spin directions with three (3) spin levels in each direction plus a no spin setting, whereas the interface in FIG. 7B has sixteen (16) spin directions and eleven (11) spin levels, and the interface in FIG. 8 could be allow for any polar spin direction and any level of spin amount between 0% and 100%, inclusive. Generally, the input parameters of the system according to the present invention provide users with a method to easily select any possible pitch, even if they don't know what it is called.

Selecting a pitch by name can provide a convenient, although limited method of user input. This new system can be extended to include pitch names as an alternative input method. If a pitch is selected by name, the corresponding spin direction is still displayed for confirmation. If a direction is selected, the corresponding pitch name is displayed for confirmation, such as shown by the screen in FIG. 8. Accordingly, the input parameters of the system according to the present invention can also provide consistency between the two methods of selecting a pitch.

On one and two wheeled pitching machines, the plane of the wheel(s) defines the axis of ball spin. To change the orientation of the spin axis on these machines, the section of the machine housing the wheels must be rotated. By mounting the spin direction and/or amount displays on the rotating section, a simplified display may be used, such as the linear spin indicator shown in FIG. 6. The orientation of the spin axis is defined by the wheel orientation, so when the machine rotates with the roll adjustment, the display preferably rotates with it, keeping the display at the correct orientation. It will be appreciated that the direction of the ball spin relative to the axis of spin rotation can be clockwise or counterclockwise depending on the relative speed differential between two wheels and which wheel is spinning faster, or in the case of a single-wheeled pitching machine whether the wheel itself is rotating clockwise or counterclockwise. Accordingly, the simplified display shows the spin direction relative to the plane of the wheels and the axis of the ball spin and the relative spin amount in either direction.

For one and two wheel machines, the display can also be located on the fixed portion of the machine, but the adjustable section must still be rotated either manually, or automatically by the control system, to match the selected spin direction. If the rotation is manual, the control system can feature a graphical display showing the user how to orient the machine for the selected pitch.

As an obvious variation to the disclosed novel invention, one can also add a feature to change the displayed units of velocity (miles per hour or kilometers per hour, for example) as selected by the user.

Another shortcoming in the prior art is the inability to quickly adjust for differences in balls. At a given wheel speed, a heavier ball will be thrown at a slower velocity than a lighter ball. By adding an input selection for type of ball (baseball or softball, for example), the displayed pitch speed can be corrected, based on the weight of the ball selected.

The user interface described above provides a benefit not realized before by those skilled in the art of pitching machines. The software and hardware configuration of the subject invention provides users a simple, direct method for specifying pitch parameters on any type of machine. These input parameters can easily be used to calculate the individual wheel speeds required to generate the selected pitch.

Because the user may not be familiar with amount of spin used with typical pitches, (RPM of an average curveball, for example), it is convenient to select a maximum reasonable spin amount, say 3000 RPM, 3600 RPM, or some other ball spin rate suitable for the balls being delivered, and let the user select a percentage of that maximum amount. For calculation, it is also convenient to express the spin amount setting as tangential wheel speed difference. For example, a 25 mph difference on a two wheel machine set to throw a pitch of 50 mph would give tangential wheel speeds of 25 and 75 (50+/−25).

For arithmetic calculations, a frame of reference or coordinate system must be defined for spin direction. It is convenient to select the vertical direction to be 0 degrees, with angles increasing in a clockwise direction, as seen by the machine operator.

On a multiple wheel machine with inputs, wheel speed is calculated as set forth below.

PS=pitch speed

ANG1=direction of spin measured as an angle

SPNPCT (or SPINAMOUNT)=amount of spin, a percentage of the maximum tangential wheel speed difference MAXSPIN=maximum tangential wheel speed difference for each wheel positioned at an angle, ANG2 tangential wheel speed, WS, may be calculated as provided in the equation below:

$$WS=PS-SPNPCT*\cos(ANG2-ANG1)*MAXSPIN$$

So for the three (3) wheel machine shown in FIG. 9, with wheel angles of 60, 180, and 300 degrees, the respective wheel speeds are calculated according to the corresponding three (3) equations listed below.

$$WS1=PS-SPNPCT*\cos(60-ANG1)*MAXSPIN$$

$$WS2=PS-SPNPCT*\cos(180-ANG1)*MAXSPIN$$

$$WS3=PS-SPNPCT*\cos(300-ANG1)*MAXSPIN$$

For a two (2) wheel machine, the wheel angles are 0 and 180 degrees, simplifying the equations as listed below.

$$WS1=PS-SPNPCT*MAXSPIN$$

$$WS2=PS+SPNPCT*MAXSPIN$$

where the ball spins towards the slower wheel. It will be appreciated that in the two-wheel machine, either wheel can be selected as the slower wheel so that the ball may be spun in opposite directions. Generally, according to the present invention for multi-wheel pitching machines, wheel speeds are calculated with the wheel speed equations and the corresponding user inputs for the variables in these equations, i.e., pitch speed, spin amount, and spin direction.

A computer program written in C for a three (3) wheel machine was included in a separate attachment to the provisional application, and is also a part of the file wrapper for this application's parent non-provisional patent application as an appendix, both of which are incorporated herein by reference. This program takes digital inputs from the switches, such as shown in FIG. 7A and controls the multiple LEDs also shown in FIG. 7A to create a display indicating pitch speed, spin direction, and spin amount. The program can receive these same input parameters from the other types of user interface panels, such as shown in FIGS. 6, 7B, 8, 22, and 23 but for the display panel of FIG. 7B, the polar position of the indicia on the rotating knobs as aligned with the indicators on the face of the panel indicate the selections of pitch speed, spin direction, and spin amount, and similarly for the display screen of FIG. 8, the graphically displayed widgets show these same input parameters. The program also writes values or otherwise translates the input parameters into control signals that the computer processor communicates to drives for the motors that rotate the respective wheels in order to control the wheel speeds.

Other prior art pitching machines have used tables of values obtained by trial and error to aim their machines. These values are programmed by either the manufacturer or the user, but always by trial and error for a predefined set of pitches that have been tabulated according to the pitching machine hardware, such as the wheel speeds and the horizontal and vertical angles of the machine, so the prior art machines were not able to calculate aim-points for pitches as in the present invention's computer processor which uses acceleration calculations based on the pitch speed, the spin rate, and the spin direction. This limits the available number of pitches in the prior art machines. The inventive system disclosed herein is different. The achieved goal by this invention, lacking in the prior art, is to modify the aim of the machine automatically using acceleration equations for the ball based on the pitch speed and spin rate as well as the spin direction so that no matter how the pitch is changed by the user (speed, curve direction, or curve amount), the ball ends up in the same place when it crosses the plate. Whenever a pitch is changed, the present system can adjust for the change according to the steps listed below.

1) The pitch trajectory of a ball for a selected pitch is calculated using acceleration equations based on the pitch input parameters of pitch speed, spin amount, and spin direction, giving data for the theoretical impact point, $X_{sp}$ and $Y_{sp}$, at a particular distance, Z, from the pitching machine according to the given orientation of the machine. As explained in detail below, $X_{sp}$ and $Y_{sp}$ can be calculated for different types of balls in a number of ways using acceleration equations with the user entering the inputs for the variables of distance (Z) pitch speed, spin amount, and spin direction, i.e., $X_{sp}$, $Y_{sp}=f_{Acc}$ (Z, pitch speed, spin amount, spin direction).

2) The theoretical impact point of the selected pitch ($X_{sp}$, $Y_{sp}$) as calculated by the acceleration equations is compared to the theoretical impact point of the previously selected pitch as the reference aim-point ($X_{ref}$, $Y_{ref}$).

3) The machine's aim is adjusted by changing the orientation of the machine to adjust the ball's initial trajectory of the selected pitch to account for the difference in the selected pitch's theoretical impact point from the reference aim-point, so that each pitch will impact the same point.

Impact point may be adjusted manually, but it will affect all pitches. Impact point, or selected aim-point with the pitch parameter inputs, is the horizontal and vertical target location of a pitch as it crosses the plate. According to the present invention, the horizontal and vertical components of the selected aim-point at the target location can be adjusted within in a target zone by user input of the slider selectors as shown in FIGS. 8, 22, and 23, and the additional slider calculations operate with the aiming steps summarized above to automatically alter the trajectory of the ball to change the corresponding aim-point. The slider selectors are shown as a linear horizontal slider and a linear vertical slider in the illustrations with positive and negative deviations from a set reference aim-point (0±X, 0±Y), such as the previous pitch, which is beneficial to the aiming process of the present invention which operates according to a difference in the horizontal and vertical location for the calculated impact point of a selected pitch from the reference pitch's aim-point which may intentionally not be set at the center of the target zone.

It will be appreciated that the setup mode of operation for the pitching machine may allow the user to set an absolute reference aim-point, such as the center of a strike zone, and rather than having horizontal and vertical sliders, the graphic display could show the strike zone with a buffer target zone around the strike zone. In such a system, the user input could be a particular region within the strike zone or somewhere in the buffer zone, and the determination of the machine orientation will be based on a differential from the orientation at the setup aim-point to an orientation that will produce the selected aim-point. It will also be appreciated that in some sports, it may be beneficial to use a polar coordinate system to define a target zone rather than the rectangular target zone that is particularly described and shown in the current embodiments. It will also be appreciated that for different types of ball throwing machines, the acceleration equations may use a different reference aim-point and differential distances to the desired aim-point. For example, with a football throwing machine that may simulate a kick or pass of the football, the horizontal location of the ball's endpoint can be set as a constant at the shoulder height of an average player, and the computer processor would use the acceleration equations to determine the velocity and orientation of the machine to deliver the football to a specified location on the field (i.e., an aim-point in a receiver's route or an aim-point for a returner's catch) that has a distance and angular position from the machine.

The following includes all variables used, their definition, units, and how they were derived-hard numbers defined by the hardware, user inputs, and calculated values. The variables and formulae disclosed herein are preferably resident within the unique nonobvious software program used in the subject ball pitching machine invention's computer processor that receives the input parameters, performs the calculations for the automatic aiming determinations, and provides the control signals to the drives for the motorized spinning wheels and stepper motors, and are herein referred to as arithmetic formulae for simplicity, and serve as full disclosure of the claimed methods for the software as it is run on the computer processor. As indicated above, the software can run on a computer processor that is a part of the ball pitching machine, such as the processor operating within the control panel or touchpad display, or on the computer processor of the wireless devices, such as a tablet computer or smartphone. Further explanations of the variables, input parameters, and calculations are provided below.

| VARIABLES | DESCRIPTION | UNITS | ORIGIN | INPUT | NOTES |
|---|---|---|---|---|---|
| Maxspin | max ball spin | RPM | constant | 750 | |
| Stepsize | step per pulse | degrees | constant | 0.0383 | 0.03829787 |
| pitchspeed | pitch speed | mph | user input | 72 | |
| Z | distance to plate | ft | user input | 55 | |
| spinangle | ball spin angle | degrees | user input | 90 | 0 = up, CW is positive |
| spinamount | % of max spin | % | user input | 50 | |
| CLift | coefficient of lift | in/(s$^2$ * RPM * mph$^2$) | user input | 0.00003 | nonstandard definition of CLift |
| spinamountRPM | ball spin amount | RPM | calculated | 375 | |
| acc-x | horizontal acceleration | in/s$^2$ | calculated | 58.32 | |
| acc-y | vertical acceleration | in/s$^2$ | calculated | −386.40 | gravity = −386.4 |
| T | time in flight | s | calculated | 0.52 | |
| X | horizontal distance | inches | calculated | 7.91 | |
| Y | vertical distance | inches | calculated | −52.41 | |
| ang-x | horizontal angle | degrees | calculated | 0.69 | |
| ang-y | vertical angle | degrees | calculated | −4.54 | |
| xstep | hor steps | steps | calculated | −18 | left <0 |
| ystep | ver steps | steps | calculated | 119 | down <0 |

Acceleration, Aim-Point & Automatic Aiming Calculations $$\text{spinamountRPM} = (\text{spinamount}/100) * \text{maxspin}$$

$$\text{acc-}x = \sin(\text{radians}(\text{spinangle})) * \text{spinamountRPM} * \text{CLift} * \text{pitchspeed}^2$$

$$\text{acc-}y = \cos(\text{radians}(\text{spinangle})) * \text{spinamountRPM} * \text{CLift} * \text{pitchspeed}^2$$

$$t = z/(1.4667 * v)^2$$

$$x = 0.5 * \text{acc-}x * t^2$$

$$y = 0.5 * \text{acc-}x * t^2$$

$$\text{ang-}x = \text{degrees}(\arctan(x/(z*12)))$$

$$\text{ang-}y = \text{degrees}(\arctan(y/(z*12)))$$

$$x\text{step} = -\text{int}(\text{ang-}x/\text{stepsize} + 0.5)$$

$$y\text{step} = -\text{int}(\text{ang-}y/\text{stepsize} + 0.5)$$

Slide Adjustments for Changing Aim-Point in Target Zone

| xslide | horizontal distance | inches | user input | 6 |
|---|---|---|---|---|
| yslide | vertical distance | inches | user input | 12 |
| ang-xm | horizontal angle | degrees | calculated | 0.52 |
| ang-ym | vertical angle | degrees | calculated | 1.04 |
| xstepm | hor steps (manual) | steps | calculated | 14 |
| ystepm | ver steps (manual) | steps | calculated | 27 |

Slider Calculations for Changing Aim-Point in Target Zone $$\text{ang-}xm = \text{degrees}(\arctan(x\text{slide}/(z*12)))$$

$$\text{ang-}ym = \text{degrees}(\arctan(y\text{slide}/(z*12)))$$

$$x\text{step}m = -\text{int}(\text{ang-}xm/\text{stepsize} + 0.5)$$

$$y\text{step}m = -\text{int}(\text{ang-}ym/\text{stepsize} + 0.5)$$

Nomenclature Descriptions maxspin—The maximum wheel speed difference used to spin the ball, measured in RPM. Ball spin is created by spinning the throwing wheels at different speeds. It is an arbitrary value used to ease pitch specification by allowing users to specify spin by percentage instead of RPM.

stepsize—the step angle of the aiming stepper motor, including any gears pitchspeed—pitch speed z—distance from machine to plate spinangle—direction of ball spin spinamount (or spnpct)—amount of ball spin as a percentage of maxspin CLift—coefficient of lift, a value used to calculate the ball's acceleration perpendicular to its travel from spinning. Based on ball spin and velocity. Not the same as the general engineering term. Can be user adjusted to account for air density and ball condition.

spinamountRPM—calculated value of ball spin in RPM acc-x—horizontal acceleration acc-y—vertical acceleration, includes gravity t—calculated time in flight x—calculated distance ball moves horizontally during flight y—calculated distance ball moves vertically during flight ang-x—angle ball moves horizontally during flight ang-y—angle ball moves vertically during flight xstep—number of stepper motor steps to sweep ang-x ystep—number of stepper motor steps to sweep ang-y xslide—horizontal distance adjustment measured at impact point yslide—vertical distance adjustment measured at impact point ang-xm—angle adjustment to cause xslide distance adjustment ang-ym—angle adjustment to cause yslide distance adjustment xstepm—number of stepper motor steps to sweep ang-xm ystepm—number of stepper motor steps to sweep ang-ym The use of equations to directly calculate the horizontal acceleration and the vertical acceleration based on a fixed coefficient of lift for a spinning ball according to the Magnus effect is not entirely accurate. The force, or acceleration for a given mass, produced by the Magnus effect (i.e., the "Magnus acceleration") can be estimated by the general equation listed below. In this equation, CLift is a user adjusted constant, spinamountRPM is ball spin in RPM, and pitchspeed is the pitchspeed in MPH. As indicated in the table above, CLift is not used in its classical definition, but is empirically defined by the user. For example, CLift would change to adjust for different types of balls, such as the different mass (directly corresponding to different weights for different types of balls), different geometric shapes (spherical like a baseball and softball or ovoid like a football or rugby ball), different sizes (baseball size or softball size) as well as different surface features for balls having the same geometric shapes, size dimensions and mass (i.e., smooth, dimpled, or laced), and atmospheric conditions. This empirical definition also compensates for inconsistency in the units used to define the pitch, ie MPH and RPM.

Magnus acceleration=CLift*spinamountRPM*pitchspeed^2

As evident for the acc-x and acc-y equations above, the Magnus acceleration value is broken into horizontal and vertical components based on the direction of the spin, i.e., the spin angle, and a constant gravitational acceleration is added to the vertical component. With the acceleration being estimated as constant during the entire flight time of the pitch, aiming can be calculated using the classic physics equation for displacement with constant acceleration (i.e., x=x0+v0t+0.5at^2). Although useful, this method for aiming is not completely accurate where it assumed Magnus acceleration was linearly proportional to the ball's spin rate and to the square of the ball's speed and does not consider drag forces at all. Additionally, this aiming method ignores the effect of recoil on machine aim, which varies with pitch speed and ball weight. When the ball is thrown, a reaction force is transmitted through the machine's structure; the machine doesn't slide due to friction between the base and the ground, but the flexibility in the machine's structure causes the pitch angle of the machine to tilt up slightly. The faster that the ball is thrown, the greater the reaction force and the greater the change in the recoil pitch angle. Accordingly, simplifying assumptions that do not account for the complex interactions of varying acceleration, drag, and recoil effects produce calculations from the equations which do not fully match observed results from the machines. By using experimentally determining values for acceleration are various pitch speeds, these effects are integrated into the derived aiming calculations.

There are different ways to correct for these simplifying assumptions while still using calculations for acceleration in aiming the machine. For example, an effective coefficient of lift ($CLift_{eff}$) could be tabulated for different types of balls as well as different speeds and spin rates, i.e., $CLift_{eff}$=f(ball type, pitch speed, spin rate). The $CLift_{eff}$ function or table would account for increased recoil at higher speeds as well as the drag effects at different speeds. It will be appreciated that $CLift_{eff}$ could be a comprised of a baseline CLift for each type of ball ($CLift_{b1}$) that may be selected according to its mass, geometry, dimensions, and surface features, and a correction factor ($F_{Corr}$) could be applied to $CLift_{b1}$ based on the pitch speed and spin rate for a given type of ball ($CLift_{eff}$=$CLift_{b1}$(ball type)*$F_{Corr}$(pitch speed, spin rate). Similarly, it may be possible to construct a single acceleration equation for each ball type that accounts for variations according to different pitch speeds, i.e. acceleration=f(pitch speed, spin rate), in which pitch speed becomes an independent variable in the equation.

Figure 26A:
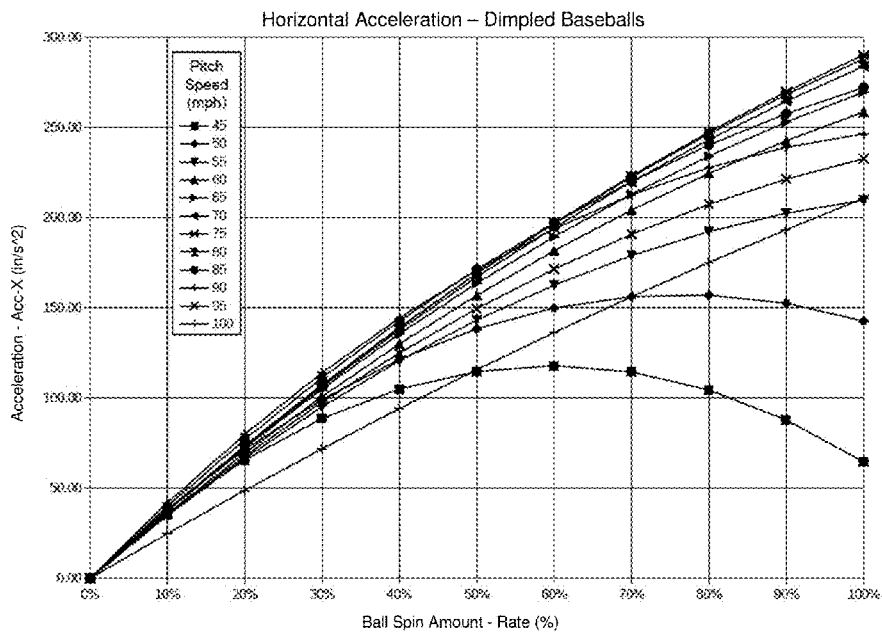
FIGS. 26A-26D: Graphs of horizontal and vertical acceleration data for dimpled and laced balls.
Figure 26B:
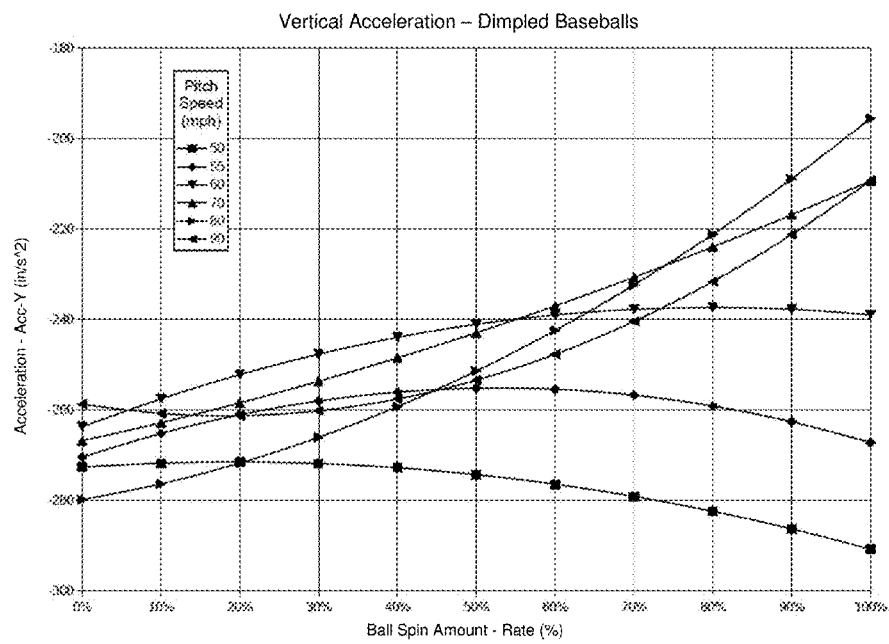
Figure 26C:
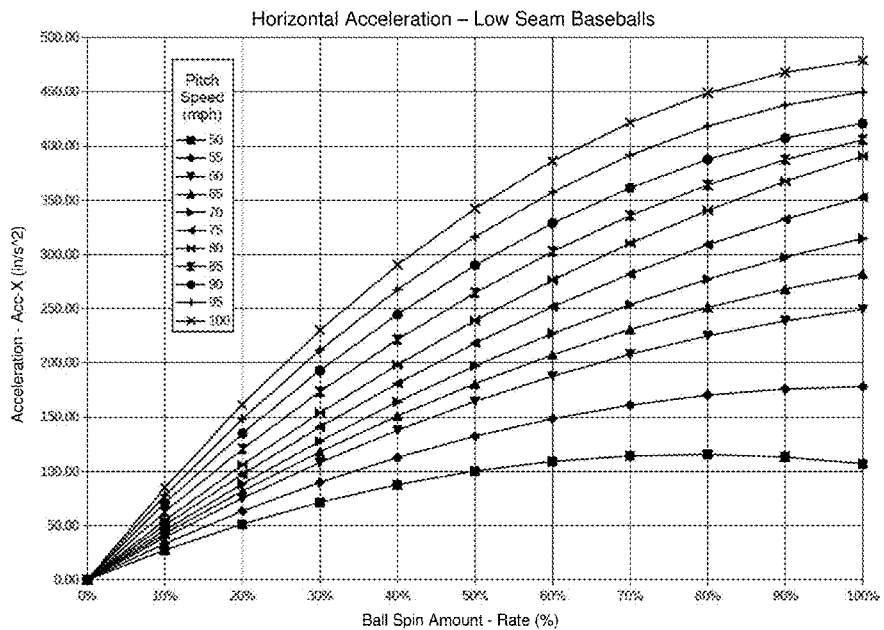
Figure 26D:
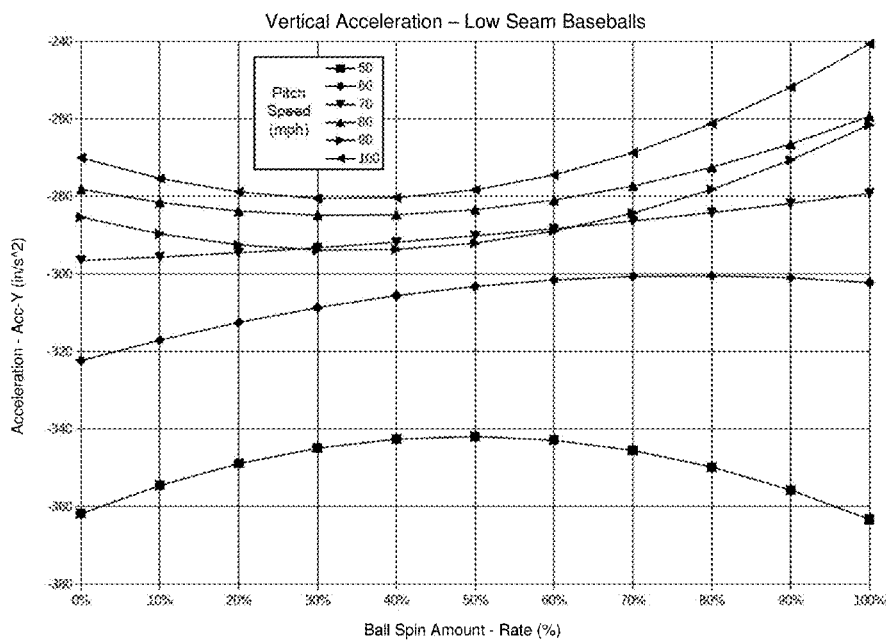

According to one method particularly explained in detail below and shown in the graphs of FIGS. 26A-26D, sets of horizontal acceleration equations and vertical acceleration equations for different pitch speeds have been empirically developed for varying spin rates for two (2) different types of balls, a dimpled baseball (FIGS. 26A and 26B) and a low seam laced baseball (FIGS. 26C and 26D). Persons of ordinary skill in the art will appreciate that the original equations for horizontal acceleration (acc-x) and vertical acceleration (acc-y) could continue to be used to match the same empirical data by the use of the variable ($CLift_{eff}$) or the baseline CLift ($CLift_{b1}$) for each type of ball and the variable correction factor ($F_{Corr}$), wherein these variables change according to the pitch speed and spin amount.

While prior art pitching machines have also used empirically determined data for aiming, the variables stored for aiming the machines and the overall methods used in the prior art systems are extremely limited because they are based on empirically developed tables of hardware parameters, such as wheel speeds and horizontal and vertical angles of the machine, which represent individual pitches that could be selected but would not allow for calculating the aim based on the acceleration of the balls according to the pitch speed and spin rate set without having to select a particular type of pitch. Since the tables of the prior art machines are based on wheel speeds and the orientation of the machine, new pitches could not be defined without performing additional trial and error tests and then creating new table entries for the newly defined pitches. Additionally, these prior art tables would be inaccurate if the distance to the target point changed from the set distance used when the tables were produced. Accordingly, there remains a need to have aiming equations that use calculated acceleration values of the balls which can be used to automatically aim any pitch according to its speed and spin rate at any given distance rather than tables of hardware parameters that only work for a given set of predefined pitches at a particular set distance. Put another way, there is a need for automated aiming that is calculated using acceleration data for an unlimited number of different pitches, possibly at different distances, rather than manually determining the aiming for a set number of pitches at a set distance and storing the aiming data according to specific hardware parameters of the pitching machine which does not allow for aiming to be determined according to variations in pitch speed and spin rate as well as possible variations in distance.

According to one version of the present invention's aiming calculations, the computer processor performs automatic aiming determinations using acceleration equations with pitch speed and spin rate as inputs to calculate the accelerations, and spin direction is used in breaking the accelerations into horizontal and vertical components. According to the equations provided above, the standard calculation for Magnus acceleration and the assumption of constant gravitational acceleration can be used. Alternatively, two (2) sets of empirically determined quadratic equations can be used to determine the accelerations for a given pitch speed and spin rate. The first set of equations is used to determine the "net gravitational" acceleration and combines the effects of gravity, drag, and machine recoil. Magnus acceleration is broken into horizontal and vertical components based on the spin direction, while the second "net gravitational" acceleration of the pitched ball is always vertical. Accordingly, the difference between this inventive method and other embodiments that assume constant gravitational acceleration and apply standard Magnus calculations vary in how horizontal and vertical acceleration are determined.

In determining the Magnus acceleration and net gravitational equations, a three-wheeled pitching machine was used to throw pitches at a wall 54 feet away and the ball's impact point were recorded. A grid was drawn on the wall to aid in determining the impact location of each pitch. For convenience, separate tests were run for determining horizontal and vertical acceleration. This allowed the observer to record a single value for each pitch, rather than two. Multiple balls for each pitch setup were thrown, and the average impact location was recorded.

The machine was set to throw pitches between 45 and 100 mph and ball spin was set to a horizontal direction to isolate Magnus acceleration from drag and gravitational effects. The ball spin rate ranged from 0 to 3000 RPM. For convenience, ball RPM was recorded as a percentage of the top rate. Whenever the impact location was more than 12 inches from the original aim point, that is the ball was curving or dropping more than 12 inches, the machine's aim was adjusted by 12 inches, and this value was added back into the observed impact location. This was done both for convenience and to keep the flight path a consistent length. Additionally, the tests were run using dimpled plastic baseballs and low seam standard laced baseballs.

In the preferred embodiment equations were developed using two popular ball types, namely laced and dimpled baseballs. Ball type and condition affect pitch trajectory. To accommodate additional types of balls, such as softballs or lightweight foam practice balls, new equations can be developed using the same procedures described herein. A less accurate but easier method is to apply a user defined "correction factor" to the calculated value for acceleration. For example, if the standard calculated value for Magnus acceleration of a certain pitch is 200 in/s^2 and the user selects a correction factor of 0.8, a value of 200*0.8=160 in/s^2 is used for that pitch. This correction factor, defined by the user at time of machine use, can also correct for variations in atmospheric conditions that affect pitch trajectory.

Horizontal acceleration was calculated from horizontal impact location per the classic physics formula as provided below, with t being the time of flight, t=distance/velocity.

$$x = x_0 + v_0 t + 0.5 a t^2$$

or $a = 2*(x-x_0)/t^2$

Additionally, vertical acceleration was measured using the same method except that the vertical impact location was recorded instead of horizontal.

The results for horizontal acceleration for dimpled baseballs and laced baseballs are shown below in Table I-A and Table I-B, respectively.

TABLE I-A

Horizontal acceleration, plastic dimpled baseballs

| Pitch Speed (mph) | C1 | C2 | C3 |
|---|---|---|---|
| 50 | −268.2 | 410.9 | 0 |
| 55 | −153.4 | 363.1 | 0 |
| 60 | −110.5 | 369.1 | 0 |
| 65 | −115.4 | 385.0 | 0 |
| 70 | −100.7 | 384.6 | 0 |
| 75 | −95.4 | 385.7 | 0 |
| 80 | −99.9 | 388.0 | 0 |
| 85 | −141.0 | 413.2 | 0 |
| 90 | −191.0 | 437.5 | 0 |
| 95 | −132.9 | 365.6 | 0 |
| 100 | −41.2 | 251.9 | 0 |

TABLE I-B

Horizontal acceleration, low seam laced baseballs

| Pitch Speed (mph) | C1 | C2 | C3 |
|---|---|---|---|
| 50 | −187.7 | 410.9 | 0 |
| 55 | −173.5 | 363.1 | 0 |
| 60 | −159.3 | 369.1 | 0 |
| 65 | −159.5 | 385.0 | 0 |
| 70 | −159.7 | 384.6 | 0 |
| 75 | −167.3 | 385.7 | 0 |
| 80 | −174.9 | 388.0 | 0 |
| 85 | −246.7 | 413.2 | 0 |
| 90 | −318.4 | 437.5 | 0 |
| 95 | −365.3 | 365.6 | 0 |
| 100 | −412.2 | 251.9 | 0 |

The results for vertical acceleration for dimpled baseballs and laced baseballs are shown below in Table II-A and Table II-B, respectively.

TABLE II-A

Vertical acceleration, plastic dimpled baseballs

| Pitch Speed (mph) | C1 | C2 | C3 |
|---|---|---|---|
| 50 | −29.61 | 11.46 | −272.6 |
| 55 | −54.49 | 57.72 | −270.4 |
| 60 | −41.13 | 65.9 | −263.7 |
| 65 | −10.89 | 52.01 | −265.3 |
| 70 | 19.36 | 38.12 | −266.8 |
| 75 | 37.06 | 33.82 | −273.3 |
| 80 | 54.75 | 29.52 | −279.8 |
| 85 | 66.15 | 0.70 | −269.3 |

TABLE II-A-continued

Vertical acceleration, plastic dimpled baseballs

| Pitch Speed (mph) | C1 | C2 | C3 |
|---|---|---|---|
| 90 | 77.54 | −28.12 | −258.7 |
| 95 | 87.54 | −38.12 | −248.7 |
| 100 | 97.54 | −48.12 | −238.7 |

TABLE II-B

Vertical acceleration, low seam laced baseballs

| Pitch Speed (mph) | C1 | C2 | C3 |
|---|---|---|---|
| 50 | −82.68 | 81.21 | −361.8 |
| 55 | −59.53 | 68.85 | −342.1 |
| 60 | −36.38 | 56.49 | −322.3 |
| 65 | −13.69 | 32.39 | −309.4 |
| 70 | 9.00 | 8.28 | −296.5 |
| 75 | 33.90 | −15.85 | −287.3 |
| 80 | 58.79 | −39.98 | −278.1 |
| 85 | 66.60 | −45.29 | −281.7 |
| 90 | 74.41 | −50.60 | −285.3 |
| 95 | 83.14 | −56.54 | −277.7 |
| 100 | 91.87 | −62.47 | −270.0 |

This data was then graphed, as shown in FIGS. 26A-26D, for each tested pitch speed using ball spin rate as the independent variable. Quadratic best fit curves were calculated for each tested pitch speed. The equations defining these curves provide the desired acceleration value given a pitch speed and spin rate and linear interpolation was used for pitch speeds between those tested. Based on the fit lines, the following equation resulted which is used in the improved aiming function where spinamount is the ball spin magnitude expressed as a percentage of the top spin rate of 3000 RPM.

$$acceleration = C1*spinamount^2 + C2*spinamount + C3$$

For example, for a dimpled ball, the table corresponding to the type of ball (Table I-A) is selected, and at 50 mph, the variables for C1 (−268.2), C2 (410.9), and C3 are obtained from the table, and with a 60% ball spin, the variables are entered into the quadratic equation as shown below, and the horizontal acceleration is calculated to be 150.0 in/s^2.

$$horizontal\ acceleration = -268.2 \times (0.60)^2 + 410.9*(0.60) + 0 = 150.0\ in/s^2$$

Given a particular pitch speed and ball spin rate, Magnus acceleration is found in Table I and broken into horizontal and vertical components based on the spin direction. Given the same pitch speed and ball spin rate, net gravitational acceleration is found in Table II and added to the vertical component of the Magnus acceleration to give actual vertical acceleration. Of course, different tables can be derived and used based on ball type and condition. Accordingly, the aiming function uses the resulting equations from the data collected in Tables I and II and to calculate the ball's horizontal and vertical acceleration and the resultant trajectory and in effect automatically aim the pitched ball based on the given parameters.

According to the innovative features of the invention as described above, there is an innovative interface for a ball pitching machine which accepts calculations provided above the required aim-point based on the inputs, and adjust the various electromechanical systems to deliver the game ball to an input desired target location Although there have been described particular embodiments of the present disclosure of a new and useful automatic game ball pitching machine, it is not intended that such references be construed as limitations upon the scope of this disclosure except as set forth in the following claims.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, in describing the various control panels and touchscreen displays, it will be appreciated that different versions of polar spin direction indicators and spin direction selectors that a user operates to produce a ball spin direction selection are disclosed in the various embodiments. According to the control panel disclosed in FIG. 7A, the polar array of LED indicators function as the polar spin direction indicator, and the arrow buttons are the spin direction selectors that are operated to make the ball spin direction selection whereas the control panel in FIG. 7B has rotating knobs with indicia that function as the polar spin direction indicator and also identify the ball spin direction selection. According to the control panel or touchscreen disclosed in FIG. 8, the rotating directional arrow widget functions as the polar spin direction indicator, and it also serves as the spin direction selector that is operated to make the ball spin direction selection. Finally, according to the HMI screen display in FIG. 23, the composite polar grid functions as the polar spin direction indicators, and the touchscreen is the selector that allows the user to make the ball spin direction selection with a single touch. It will be appreciated that other indicators, widgets, and grid designs could be formed in polar arrangements to serve as a polar spin direction indicators, and any such alternative polar spin direction indicators would merely be a change in the design appearance of the polar spin direction indicator feature as it is alternatively described in the specification for the optional embodiments and as it is generally recited in the claims. Accordingly, an alternative design for the polar spin direction indicator would be a design choice that is within the scope of the polar spin direction indicator recited in the claims. Thus, the breadth and scope of the present invention should not be limited by any of the above-described exemplary embodiments, but should be defined only in accordance with the following claims appended hereto and their equivalents.

What is claimed is:

1. A method for controlling a throwing machine for a ball, comprising the steps of:
   providing a support frame for the ball throwing machine;
   connecting a plurality of motorized spinning wheels to the support frame, wherein the motorized spinning wheels engage the ball to be thrown by the throwing machine;
   providing a user interface panel having a graphical display, wherein the graphical display is comprised of a pitch speed indicator, a spin direction indicator, and a spin amount indicator;
   connecting a plurality of wheel speed controllers to the motorized spinning wheels, respectively;
   providing a computer processor in operative communication with the user interface panel and the plurality of wheel speed controllers;
   receiving at the computer processor from the interface panel a pitch speed selection, a ball spin direction selection, and a spin amount selection;

calculating in the computer processor a set of wheel speeds for the motorized spinning wheels, respectively, according to a set of corresponding wheel spin equations, wherein the pitch speed selection, the ball spin direction selection, and the spin amount selection are variable pitch parameter input entries to the wheel spin equations;

communicating the set of wheel speeds from the computer processor to the wheel speed controllers as a set of wheel speed control signals;

receiving in the computer processor a distance for a target location spaced away from the throwing machine; and calculating in the computer processor an impact point for the ball at the distance according to a set of acceleration equations and a time in flight equation, wherein the pitch parameter input entries used in the set of wheel speed equations are used in the set of acceleration equations to determine the impact point.

2. The method of claim 1, wherein the spin direction indicator is shown with a plurality of optional spin directions in at least one of a linear configuration and a polar configuration.

3. The method of claim 2, wherein the spin amount selection is a percentage of a maximum ball spin amount, wherein the ball spin direction selection is an angular direction, wherein the spin amount indicator is separate from the polar configuration of the spin direction indicator.

4. The method of claim 3, wherein the set of wheel spin equations are further comprised of the pitch speed minus the product of a maximum tangential wheel speed difference multiplied by the spin amount selection and multiplied by a trigonometric function of the difference between a wheel position angle and the ball spin direction selection.

5. The method of claim 2, wherein the spin amount selection is a percentage of a maximum ball spin amount, wherein the ball spin direction selection is one of two opposite directions, wherein the spin amount indicator is a part of the linear configuration of the spin direction indicator, and wherein the set of wheel spin equations are further comprised of a maximum tangential wheel speed difference multiplied by the spin amount selection and the ball spin direction selection.

6. The method of claim 1, further comprising the steps of:
connecting the motorized spinning wheels to the support frame through a rotating joint and an adjustment mechanism between the rotating joint and the support frame allowing for a plurality of orientations between the motorized spinning wheels and the support frame;
determining differences in a horizontal distance and a vertical distance from the impact point to a reference aim-point;
receiving in the computer processor a first orientation of the motorized spinning wheels relative to the support frame, wherein the first orientation corresponds with the impact point;
determining in the computer processor using the set of acceleration equations a set of orientation changes for the motorized spinning wheels from the first orientation to a second orientation to move the impact point back to the reference aim-point, and
operating the adjustment mechanism according to the orientation changes to vary the rotating joint from the first orientation to the second orientation.

7. The method of claim 6, further comprising the steps of:
connecting the motorized spinning wheels to the support frame through a set of rotating joints and a corresponding set of adjustment mechanisms between the rotating joints and the support frame allowing for a plurality of orientations between the motorized spinning wheels and the support frame;
connecting a set of electric motors to the adjustment mechanisms;
determining in the computer processor a set of electric motor control signals for the motorized spinning wheels' orientation changes from the first orientation to the second orientation; and
communicating the set of electric motor control signals to the motors for automatically reorienting the throwing machine's motorized spinning wheels.

8. The method of claim 6, further comprising the steps of:
mounting a turntable to a base;
connecting the support frame to the turntable;
determining in the computer processor a set of electric motor control signals for the motorized spinning wheels' orientation changes from the first orientation to the second orientation, wherein the set of electric motor control signals includes a yaw axis signal and a pitch axis signal;
connecting a first electric motor between the base and the support frame through the turntable, wherein the first electric motor is operatively communicating with the computer processor and receives the yaw axis signal and moves the support frame between a first yaw orientation and a second yaw orientation relative to the base in response to the yaw axis signal received from the computer processor; and
connecting a second electric motor between the support frame and at least one of the motorized spinning wheels, wherein the motorized spinning wheels are fixedly connected to each other and are rotatably mounted to the frame through the rotating joint, and wherein the second electric motor is operatively communicating with the computer processor and serves as the adjustment mechanism to move the motorized spinning wheels between a first pitch orientation and a second pitch orientation relative to the support frame in response to the pitch axis signal received from the computer processor.

9. The method of claim 6, further comprising the steps of:
mounting a turntable to a base, wherein the turntable rotates relative to the base in a yaw axis;
connecting the turntable to the support frame through a first actuator, wherein the turntable moves the support frame between a first yaw orientation and a second yaw orientation relative to the base through an operation of the first actuator, wherein the first yaw orientation corresponds with the first orientation and the impact point, and wherein the second yaw orientation corresponds with the second orientation and the reference aim-point; and
connecting a mounting bracket and a second actuator between the support frame and at least one of the motorized spinning wheels, wherein the motorized spinning wheels are fixedly connected to each other and are rotatably mounted to the frame in a pitch axis through the mounting bracket that serves as the rotating joint, wherein the second actuator serves as the adjustment mechanism and is operated to move the motorized spinning wheels between a first pitch orientation and a second pitch orientation relative to the support frame, wherein the first pitch orientation corresponds with the first orientation and the impact point, and wherein the second pitch orientation corresponds with the second orientation and the reference aim-point.

10. The method of claim 9, further comprising the steps of:

connecting a third actuator between the support frame and the bracket, wherein the third actuator is operated to move the bracket and the motorized spinning wheels between a first roll orientation and a second roll orientation relative to the support frame, wherein the first roll orientation corresponds with the first orientation and the impact point, wherein the second roll orientation corresponds with the second orientation and the reference aim-point, wherein the motorized spinning wheels are a pair of motorized spinning wheels with parallel axes of rotation, and wherein the first actuator, the second actuator, and the third actuator are selected from the group of actuators consisting of a set of manual actuators, a set of electric motors, and a combination of a set of manual actuators with a set of electric motors;

receiving at the computer processor a ball type input selection from the interface panel, wherein the ball type input selection is at least one of a baseball option and a softball option; and calculating in the computer processor the pitch speed based on the ball type input selection.

11. The method of claim 6, further comprising the steps of:

providing on the user interface panel an aim-point change selector;

receiving at the computer processor an aim-point change input selection from the interface panel, wherein the aim-point change modifies a position of the reference aim-point and the corresponding horizontal distance and the vertical distance between the impact point and the reference aim-point for the calculation of the set of orientation changes.

12. The method of claim 1, wherein the spin direction indicator is further comprised of at least one vector arrow, wherein the user interface panel is at least one of a physical panel structure connected to the support frame and an electronic panel screen for a mobile computing device, and wherein the user interface panel further comprises a pitch speed indicator separate from the spin amount indicator and the spin direction indicator.

13. The method of claim 1, wherein the spin direction indicator is further comprised of at least one of a series of LED indicators arranged in the linear configuration, a series of LED indicators arranged in the polar configuration, a knob switch having a pointer indicia and positioned within a series of indicia arranged in the polar configuration on the user interface panel, and a rotary directional arrow widget.

14. A method for controlling a throwing machine for a ball, comprising the steps of:

providing a support frame for the ball throwing machine;

connecting a plurality of motorized spinning wheels to the support frame, wherein the motorized spinning wheels engage the ball to be thrown by the throwing machine;

providing a user interface panel having a graphical display, wherein the graphical display is comprised of a pitch speed indicator, a spin direction indicator, and a spin amount indicator;

connecting a plurality of wheel speed controllers to the motorized spinning wheels, respectively;

providing a computer processor in operative communication with the user interface panel and the plurality of wheel speed controllers;

receiving at the computer processor from the interface panel a pitch speed selection, a ball spin direction selection, and a spin amount selection;

calculating in the computer processor a set of wheel speeds for the motorized spinning wheels, respectively, according to a set of corresponding wheel spin equations, wherein the ball spin direction selection, the spin amount selection, and the pitch speed selection are variable pitch parameter input entries to the wheel spin equations, wherein the pitch speed selection is a speed amount, wherein the spin amount selection is a percentage of a maximum ball spin amount, and wherein the ball spin direction selection is an angular direction, wherein the set of wheel spin equations are further comprised of the pitch speed selection minus the product of a maximum tangential wheel speed difference multiplied by the spin amount selection and multiplied by a trigonometric function of the difference between a wheel position angle and the ball spin direction selection; and communicating the set of wheel speeds from the computer processor to the wheel speed controllers as a set of wheel speed control signals.

15. The method of claim 14, wherein the spin direction indicator is shown with a plurality of optional spin directions in at least one of a linear configuration and a polar configuration.

16. The method of claim 14, further comprising the steps of:

receiving in the computer processor a distance for a target location spaced away from the throwing machine;

calculating in the computer processor an impact point for the ball at the distance according to a set of acceleration equations and a time in flight equation, wherein the pitch parameter input entries used in the set of wheel speed equations are used in the set of acceleration equations;

connecting the motorized spinning wheels to the support frame through a rotating joint and an adjustment mechanism between the rotating joint and the support frame allowing for a plurality of orientations between the motorized spinning wheels and the support frame;

determining differences in a horizontal distance and a vertical distance from the impact point to a reference aim-point;

receiving in the computer processor a first orientation of the motorized spinning wheels relative to the support frame, wherein the first orientation corresponds with the impact point;

determining in the computer processor using the set of acceleration equations a set of orientation changes for the motorized spinning wheels from the first orientation to a second orientation to move the impact point back to the reference aim-point, and operating the adjustment mechanism according to the orientation changes to vary the rotating joint from the first orientation to the second orientation.

17. A method for controlling a throwing machine for a ball, comprising the steps of:

providing a base for the ball throwing machine;

mounting a turntable to the base, wherein the turntable rotates relative to the base in a yaw axis;

connecting a support frame to the turntable through a first actuator, wherein the turntable moves the support frame between a first yaw orientation and a second yaw orientation relative to the base through an operation of the first actuator;

connecting a plurality of motorized spinning wheels to the support frame, wherein the motorized spinning wheels engage the ball to be thrown by the throwing machine;

connecting a mounting bracket and a second actuator between the support frame and at least one of the motorized spinning wheels, wherein the motorized spinning wheels are fixedly connected to each other and are rotatably mounted to the frame in a pitch axis through the mounting bracket, wherein the second actuator is operated to move the motorized spinning wheels between a first pitch orientation and a second pitch orientation relative to the support frame;

providing a user interface panel having a graphical display, wherein the graphical display is comprised of a pitch speed indicator, a spin direction indicator, and a spin amount indicator, and wherein the spin direction indicator is shown with a plurality of optional spin directions in at least one of a linear configuration and a polar configuration;

connecting a plurality of wheel speed controllers to the motorized spinning wheels, respectively;

providing a computer processor in operative communication with the user interface panel and the plurality of wheel speed controllers;

receiving at the computer processor from the interface panel a pitch speed selection, a ball spin direction selection, and a spin amount selection;

calculating in the computer processor a set of wheel speeds for the motorized spinning wheels, respectively, according to a set of corresponding wheel spin equations, wherein the pitch speed selection, the ball spin direction selection, and the spin amount selection, are variable pitch parameter input entries to the wheel spin equations; and communicating the set of wheel speeds from the computer processor to the wheel speed controllers as a set of wheel speed control signals.

18. The method of claim 17, further comprising the steps of:

receiving in the computer processor a distance for a target location spaced away from the throwing machine;

calculating in the computer processor an impact point for the ball at the distance according to a set of acceleration equations and a time in flight equation, wherein the pitch parameter input entries used in the set of wheel speed equations are used in the set of acceleration equations;

determining differences in a horizontal distance and a vertical distance from the impact point to a reference aim-point;

receiving in the computer processor the first yaw orientation and the first pitch orientation corresponding with the impact point;

determining in the computer processor using the set of acceleration equations the second yaw orientation and the second pitch orientation to move the impact point back to the reference aim-point;

operating the first actuator to move the support frame from the first yaw orientation to the second yaw orientation relative to the base; and operating the second actuator to move the bracket and the motorized spinning wheels from the first pitch orientation to the second orientation relative to the support frame, wherein the first actuator and the second actuator are selected from the group of actuators consisting of a set of manual actuators, a set of electric motors, and a combination of a set of manual actuators with a set of electric motors.

19. The method of claim 18, further comprising the steps of:

connecting a third actuator between the support frame and the bracket, wherein the third actuator is operated to move the bracket and the motorized spinning wheels between a first roll orientation and a second roll orientation relative to the support frame, and wherein the motorized spinning wheels are a pair of motorized spinning wheels with parallel axes of rotation;

determining in the computer processor using the set of acceleration equations the second roll orientation to move the impact point back to the reference aim-point; and operating the third actuator to move the bracket and the motorized spinning wheels from the first roll orientation to the second roll orientation relative to the support frame.

20. A method for controlling a throwing machine for a ball, comprising the steps of:

providing a support frame for the ball throwing machine;

connecting a plurality of motorized spinning wheels to the support frame, wherein the motorized spinning wheels engage the ball to be thrown by the throwing machine;

providing a user interface panel having a graphical display, wherein the graphical display is comprised of a pitch speed indicator, a spin direction indicator, and a spin amount indicator, and wherein the spin direction indicator is shown with a plurality of optional spin directions in at least one of a linear configuration and a polar configuration;

connecting a plurality of wheel speed controllers to the motorized spinning wheels, respectively;

providing a computer processor in operative communication with the user interface panel and the plurality of wheel speed controllers;

receiving at the computer processor from the interface panel a pitch speed selection, a ball spin direction selection, and a spin amount selection, wherein the spin amount selection is a percentage of a maximum ball spin amount, wherein the ball spin direction selection is an angular direction, and wherein the spin amount indicator is separate from the polar configuration of the spin direction indicator;

calculating in the computer processor a set of wheel speeds for the motorized spinning wheels, respectively, according to a set of corresponding wheel spin equations, wherein the pitch speed selection, the ball spin direction selection, and the spin amount selection are variable pitch parameter input entries to the wheel spin equations, and wherein the set of wheel spin equations are further comprised of the pitch speed minus the product of a maximum tangential wheel speed difference multiplied by the spin amount selection and multiplied by a trigonometric function of the difference between a wheel position angle and the ball spin direction selection; and communicating the set of wheel speeds from the computer processor to the wheel speed controllers as a set of wheel speed control signals.

* * * * *